US012712749B1

(12) United States Patent
Kaplan et al.

(10) Patent No.: US 12,712,749 B1
(45) Date of Patent: Aug. 18, 2026

(54) EPOCH-BASED CROSS-CHAIN VERIFICATION

(71) Applicant: Ava Labs, Inc., New York, NY (US)

(72) Inventors: Michael Edmond Kaplan, New York, NY (US); Cameron John Schultz, Chicago, IL (US); Aaron Buchwald, New York, NY (US)

(73) Assignee: Ava Labs, Inc., New York, NY (US)

( * ) Notice: Subject to any disclaimer, the term of this patent is extended or adjusted under 35 U.S.C. 154(b) by 0 days.

(21) Appl. No.: 19/443,322

(22) Filed: Jan. 8, 2026

(51) Int. Cl.
*H04L 9/32* (2006.01)
*H04L 9/00* (2022.01)

(52) U.S. Cl.
CPC .............. *H04L 9/3297* (2013.01); *H04L 9/50* (2022.05)

(58) Field of Classification Search
CPC ................................ H04L 9/3297; H04L 9/50
See application file for complete search history.

(56) References Cited

U.S. PATENT DOCUMENTS

2018/0203992 A1* 7/2018 Kilpatrick ............... G06F 21/44
2019/0306190 A1* 10/2019 Suraparaju ............ G06F 21/602
2021/0328806 A1* 10/2021 Yang ..................... H04L 9/3247
2022/0271957 A1* 8/2022 Zamani ................. H04L 9/3239
2025/0219911 A1* 7/2025 Duan ...................... H04L 41/30
2025/0260565 A1* 8/2025 Abdelsamie .......... H04L 9/3239
2025/0378436 A1* 12/2025 Lochrane ............. G06Q 20/065

* cited by examiner

*Primary Examiner* — Mohammad W Reza
(74) *Attorney, Agent, or Firm* — McDermott Will & Schulte LLP

(57) ABSTRACT

Various aspects of the subject technology relate to systems, methods, and machine-readable media for message verification in a blockchain platform. The technology includes assigning to each newly proposed block of a first blockchain both a latest secondary-chain block height and an epoched secondary-chain block height. The system determines whether a proposed block seals a current epoch based on an epoch-duration threshold. When a block seals the epoch, the next block is assigned an updated epoched secondary-chain block height equal to the latest secondary-chain block height of the sealing block, and the system advances to a next epoch. When the block does not seal the epoch, the next block inherits the epoched secondary-chain block height of the proposed block. Message verification in the next block is performed using a validator set, fixed for the duration of the epoch, obtained from the second blockchain at the assigned epoched secondary-chain block height.

20 Claims, 9 Drawing Sheets

EPOCH-BASED CROSS-CHAIN VERIFICATION

TECHNICAL FIELD

The present disclosure generally relates to distributed ledger and blockchain technologies, and more particularly to systems and methods for maintaining consistent cross-chain message verification through the use of an epoched P-Chain height reference within network virtual machines.

BACKGROUND

Distributed ledger networks operate through multiple interoperable blockchains that maintain decentralized consensus and enable cross-chain communication. Such systems exchange structured messages—such as asset transfers, control signals, or state proofs—that must be verified before being accepted by the receiving chain. Message verification typically involves nodes, including validator nodes, that participate in consensus and maintain the authoritative state of the blockchain. These validator nodes are responsible for retrieving relevant cryptographic proofs, validating digital signatures, and confirming that a message was produced by an authorized set of validators on the sending blockchain. Message verification may depend on a shared validator registry that record validator identities, weights, and associated public keys. As blockchains evolve, reliable and consistent message verification becomes essential to ensuring correctness, preventing spoofing, and maintaining consensus safety across heterogeneous blockchain networks.

BRIEF SUMMARY

The subject disclosure provides systems and methods for verifying messages in a blockchain system using an epoch-based secondary-chain reference. According to embodiments, a computer-implemented method for message verification in a blockchain platform is provided. The method includes receiving, at a first blockchain, a proposed block that specifies both a latest secondary-chain block height and an epoched secondary-chain block height associated with a second blockchain. The method also includes determining whether the proposed block seals a current epoch by comparing a timestamp of the proposed block with an epoch-duration threshold. When the proposed block is identified as a sealing block, the method includes assigning a next block an updated epoched secondary-chain block height equal to the latest secondary-chain block height included in the sealing block and advancing to a next epoch. The method further includes verifying messages in the next block using a validator set obtained from the second blockchain at the epoched secondary-chain block height assigned to the next block, such that all blocks within an epoch are verified against a common validator set.

According to embodiments, a system is provided for verifying messages in a blockchain system using an epoch-based secondary-chain reference. The system includes one or more processors and memory storing instructions that, when executed, cause the system to receive a proposed block that specifies both a latest secondary-chain block height and an epoched secondary-chain block height associated with a second blockchain. The instructions also cause the system to determine whether the proposed block seals a current epoch by comparing a timestamp of the proposed block with an epoch-duration threshold. When the proposed block is identified as a sealing block, the system assigns a next block an updated epoched secondary-chain block height equal to the latest secondary-chain block height included in the sealing block and advances to a next epoch. The system further verifies messages in the next block using a validator set obtained from the second blockchain at the epoched secondary-chain block height assigned to the next block, thereby ensuring that all blocks within an epoch are verified against a common validator set.

According to embodiments, a non-transitory computer-readable storage medium including instructions for verifying messages in a blockchain system using an epoch-based secondary-chain reference is provided. According to embodiments, the instructions, when executed by one or more processors of a first blockchain, cause the first blockchain to receive a proposed block that specifies both a latest secondary-chain block height and an epoched secondary-chain block height associated with a second blockchain. The instructions also cause the system to determine whether the proposed block seals a current epoch by comparing a timestamp of the proposed block with an epoch-duration threshold. When the proposed block is identified as a sealing block, the instructions cause the system to assign a next block an updated epoched secondary-chain block height equal to the latest secondary-chain block height included in the sealing block and to advance to a next epoch. The instructions further cause the system to verify messages in the next block using a validator set obtained from the second blockchain at the epoched secondary-chain block height assigned to the next block, such that all blocks within an epoch are verified against a common validator set.

The above description of specific embodiments has been given by way of example. From the disclosure given, those skilled in the art will not only understand the general inventive concepts and attendant advantages, but will also find apparent various changes and modifications to the structures and methods disclosed. For example, the general inventive concepts are not limited to the specific features shown and described herein, but may be used with modifications that are within the scope of the following claims. Thus, it is sought to cover all such changes and modifications which fall within the spirit and scope of the general inventive concepts, as defined by the appended claims and equivalents thereof.

BRIEF DESCRIPTION OF THE DRAWINGS

The accompanying drawings, which are included to provide further understanding and are incorporated in and constitute a part of this specification, illustrate disclosed embodiments and together with the description serve to explain the principles of the disclosed embodiments. In the drawings.

Figure 1:
FIG. 1 is a block diagram of an operating environment with which aspects of the present disclosure can be implemented.
Figure 1:
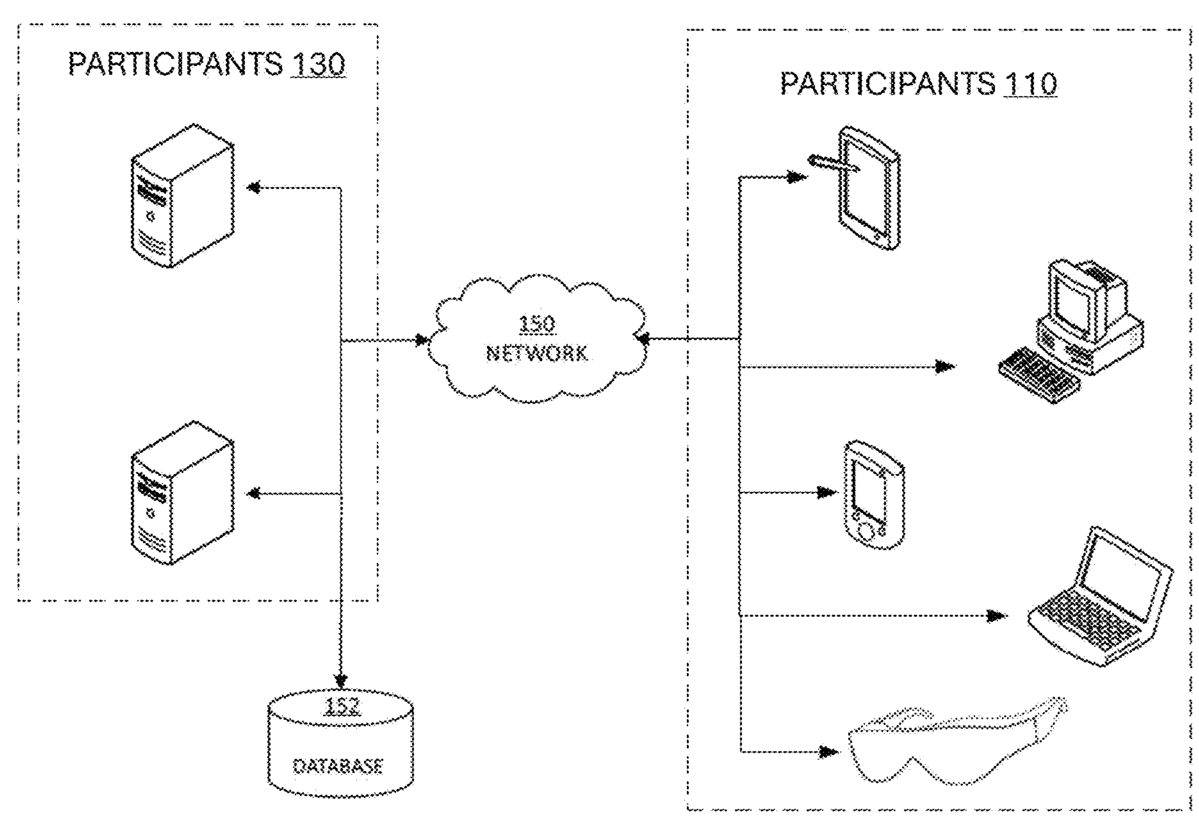

In one or more implementations, not all of the depicted components in each figure may be required, and one or more implementations may include additional components not shown in a figure. Variations in the arrangement and type of the components may be made without departing from the scope of the subject disclosure. Additional components, different components, or fewer components may be utilized within the scope of the subject disclosure.

DETAILED DESCRIPTION

In the following detailed description, numerous specific details are set forth to provide a full understanding of the present disclosure. It will be apparent, however, to one ordinarily skilled in the art, that the embodiments of the present disclosure may be practiced without some of these specific details. In other instances, well-known structures and techniques have not been shown in detail so as not to obscure the disclosure.

The detailed description set forth below describes various configurations of the subject technology and is not intended to represent the only configurations in which the subject technology may be practiced. The detailed description includes specific details for the purpose of providing a thorough understanding of the subject technology. Accordingly, dimensions may be provided in regard to certain aspects as non-limiting examples. However, it will be apparent to those skilled in the art that the subject technology may be practiced without these specific details. In some instances, well-known structures and components are shown in block diagram form in order to avoid obscuring the concepts of the subject technology.

General Overview

Distributed ledger networks operate through multiple interoperable blockchains that maintain decentralized consensus and enable cross-chain communication. Such systems exchange structured messages—such as asset transfers, control signals, or state proofs—that must be verified before being accepted by the receiving chain. Message verification typically involves nodes, including validator nodes, that participate in consensus and maintain the authoritative state of the blockchain. Message verification may depend on a shared validator registry that records validator identities, weights, and associated public keys. The shared validator registry can be employed as a coordination chain or primary network (P-Chain), that records validator identities, weights, and participation data maintaining registry of L1 and Subnet validators (including Primary Network validators). A verifying chain must reference a specific P-Chain block height to obtain a consistent view of the validator set when validating inter-chain messages or transactions. Discrepancies in the referenced P-Chain height can result in differing validator set compositions among nodes, potentially producing inconsistent verification outcomes.

Blockchains being validated by validators may be of a blockchain network (or platform) with application-level logic defined by multiple virtual machines (VMs) which enable more decentralized networks. VMs allow for the execution of smart contracts and decentralized applications on the blockchain, providing a secure and deterministic environment for code execution and enabling interoperability between blockchains or cross-chain communication.

In certain blockchain architectures, a Proposer Virtual Machine (ProposerVM) operates as an outer coordination layer that wraps an underlying virtual machine (inner VM) responsible for executing transactions and maintaining state. The ProposerVM manages block proposal logic and injects metadata into block headers that enables the blockchain to reference external state, such as information maintained on the P-Chain. When a validator produces a block, the ProposerVM embeds within that block a pointer to a specific P-Chain block height, thereby providing the inner VM with a deterministic view of the validator set or other platform-level data as of that height. This design allows independent blockchains or subnets to access a consistent snapshot of shared platform state while preserving their own execution logic, consensus, and block format. By mediating how P-Chain state is exposed to a blockchain, the ProposerVM ensures that validator-set-dependent operations including, but not limited to, signature verification or authenticated message validation, are performed against a well-defined and externally anchored reference point.

In some embodiments, the referenced P-Chain height increments arbitrarily from one block to another, requiring on-demand queries for validator sets at unpredictable heights during block execution. These dynamic lookups increase computational cost and verification latency and can hinder efficient message construction by relayers, which cannot anticipate the P-Chain height that will be used at the time of block production. Frequent updates to the validator set also limit opportunities for caching or precomputation, reducing system determinism and overall consensus efficiency. Use cases that require on-demand views of L1 or Subnet validator sets need to fetch validator sets at arbitrary P-Chain heights, while use cases that require up-to-date views need to fetch them as often as every P-Chain block.

Embodiments disclosed herein provide a solution to the above-mentioned problems rooted in computer technology, namely, cross-chain message verification. The disclosed subject technology improves the functioning of the computer itself by introducing an epoched view of the P-Chain that ensures all blocks within a defined epoch reference a consistent validator-set state. This enhances security while significantly reducing verification costs and computational overhead. According to embodiments, messages including, but not limited to, authenticated cross-chain messages, state updates, or event attestations, originating from a first blockchain can be verified on a second blockchain using the stable validator set corresponding to the epoch's P-Chain height. The verifying blockchain is therefore able to validate messages deterministically and efficiently, without requiring repeated on-demand lookups or reliance on trusted intermediaries to reconcile validator-set changes across chains.

According to embodiments, an epoched P-Chain mechanism is implemented within the ProposerVM. According to the epoched P-Chain mechanism, each proposer block includes a dual-pointer structure comprising both a P-Chain height pointer ("PChainHeight"), which may advance normally with each newly produced block, and an epoched P-Chain height pointer ("PChainEpochHeight"), which remains fixed for the duration of a defined epoch. This dual-pointer structure allows the blockchain to maintain an up-to-date view of the P-Chain while simultaneously preserving a deterministic and stable reference to a single P-Chain block height throughout the epoch for validator-set lookup and message verification. As such, P-Chain observations can progress continuously without disrupting the consistent verification rules enforced within an epoch, thereby ensuring consistent validation behavior and reducing computational overhead.

According to embodiments, an epoch is defined by a minimum time interval, hereafter "duration D", during which all blocks must reference the same epoched P-Chain height for a valid validator set. An epoch is sealed by the first block whose timestamp is greater than or equal to the sum of the epoch's start time and the duration D. The sealing block is treated as a member of the epoch it concludes, and the sealing block's latest P-Chain height is adopted as the PChainEpochHeight for the next epoch. Accordingly, if a block's parent sealed an epoch, then its PChainEpochHeight must be set to its parents PChainHeight. Otherwise, a block's PChainEpochHeight must be the same as its parent's PChainEpochHeight.

By structuring epoch advancement in this deterministic manner, the system guarantees that the P-Chain height to be used for all blocks in the forthcoming epoch is known in advance of producing the next block, thereby ensuring predictable validator-set selection and consistent verification behavior. Epochs during which the P-Chain height is fixed would widen this window to a predictable epoch duration, allowing these use cases to implement optimizations such as prefetching validator sets once per epoch, or allowing more efficient backwards traversal of the P-Chain to fetch historical validator sets. Further, because every future proposed block's P-Chain verification height is known ahead of time, consensus engines and VMs can optimize execution paths, reduce verification branching, and support more scalable multi-chain environments.

According to embodiments, the epoched P-Chain heights are required to advance monotonically, ensuring that each successive epoch references a P-Chain height that is equal to or greater than that of the preceding epoch. This monotonic progression prevents malicious or faulty proposers from reverting the epoched pointer to an earlier, stale P-Chain height, which could otherwise expose the system to inconsistent validator-set views or replay of outdated state. By enforcing these monotonicity rules, the technology constrains how far any proposer may deviate from the expected P-Chain height and thereby safeguards against manipulation or intentional selection of obsolete validator-set states, strengthening the security and integrity of cross-chain message verification.

The disclosed subject technology further provides improvements to the technological field by enabling predictable, consistent, and efficient block verification across blockchains that rely on a shared validator registry. This reduces verification costs and improves relayer reliability. The dual-pointer structure provides a functional improvement to blockchain technology because it reduces resource consumption, eliminates classes of verification failure, and enhances security guarantees for, for example, cross-chain messaging and any VM relying on P-Chain state. It transforms validation from an unpredictable per-block operation into a bounded, optimizable, and deterministic process, improving both performance and correctness across the ecosystem.

As used herein, the term "L1" generally refers to a sovereign blockchain validated directly by a subnet's validators and anchored by the P-Chain's validator registry. Each L1 can define its own VM, execution logic, fee rules, and state transition function. An L1 can produce its own blocks and maintains its own state.

As used herein, the term "blockchain" generally refers to an open and distributed public ledger comprising a growing list of records, which are linked using cryptography. By design, the blockchain is resistant to modification of the data. The blockchain can include an auditable database that provides a distributed, replicated ledger of cryptographically certified artifacts whose contents are extremely difficult to tamper with without detection, and therefore, are with very high probability, true copies of the intended content, and whose content are open for inspection via a suitable query interface.

As used herein, the term "block" generally refers to a record that is kept in a blockchain. For example, each block contains a cryptographic hash of the previous block, a timestamp, and transaction data, which can generally be represented as a Merkle tree root hash.

As used herein, the term "primary network" generally refers to a special subnet, which validates built-in blockchains. Members of the subnets may also be a member of the primary network. In some embodiments, a subject that is member of the primary network, stakes (e.g., acquires or "buys") one or more tokens from the primary network. As a result, blockchain validators can validate built-in blockchains on the primary network and have also staked primary network tokens.

EXAMPLE ARCHITECTURE

FIG. 1 illustrates an exemplary network architecture 100 to provide a blockchain platform (e.g., blockchain network implementation/deployment platform) for managing blocks and the transfer of messages, according to some embodiments of the present disclosure. Blockchains in the blockchain network are validated by (i.e., the state of it is maintained) by a validator set registered on a shared metadata chain (the "P-Chain"). The P-Chain maintains the authoritative registry of all validator weights, keys, and membership across subnets, and all chains in the system reference this registry when verifying inter-chain or cross-subnet messages. According to some embodiments, the P-Chain maintains a registry of L1 and subnet validators (including Primary Network validators). Validators are added, removed, or their weights changed by issuing P-Chain transactions that are included in P-Chain blocks. When describing an L1 or subnet's validator set, the weights, BLS keys, and Node IDs of the active validators at a particular P-Chain height are being described.

The network architecture 100 includes a shared registry of validators made up of all the chain/subnet validator sets. The blockchain may be a linear chain of blocks of the same dimension, such as the same height, size, length, etc. Blocks of the blockchain may comprise or store data or organized information (e.g., records of information), including a cryptographic hash of the previous block, a timestamp, and transaction data, for example. In some embodiments, the network architecture 100 provides a multi-chain blockchain platform comprising a set of L1 blockchains, each validated by a corresponding validator set registered on the P-Chain. Blocks of each L1 chain include or reference structured data—such as transaction records, timestamps, and pointers to specific P-Chain block heights—used to determine the relevant validator set at the time of message verification.

The network architecture 100 of FIG. 1 includes one or more participants 110 and one or more participants 130 which are communicatively coupled through the network 150. The blockchain architecture of the network architecture 100 can be a distributed database that maintains a continuously growing list of ordered records as the blocks. The blockchain architecture may implement a messaging protocol based on the shared registry of validators. The messaging protocol is designed to facilitate seamless communication between various chains, allowing for the transfer of data and value across different subnets, thereby enhancing the interoperability of the blockchain network.

It is understood that the participants 130 may include the participants 110 as well, such that they are peers. As an example, the participants 130 may include a cloud server or a group of cloud servers. In some implementations, the participants 130 may not be cloud-based servers (i.e., may be implemented outside of a cloud computing environment) or may be partially cloud-based. For example, the participants 110 may include any one of a laptop computer, a desktop computer, or a mobile device such as a smart phone, a palm device, or a tablet device. As an example, the participants 110 may be clients of the blockchain platform for creating, expanding, or otherwise modifying customized blockchain networks and/or private or public subnets. As an example, the participants 110 can function as validators. As an example, the participants 110 may be VMs that function as nodes in the blockchain network. The participants 110 that function as nodes can run software to verify block and transaction data, store data, validate, respond to network requests for data, and/or the like for the existing blockchain. For example, nodes may verify aggregate BLS signatures in inter-chain messages by retrieving validator sets from the P-Chain at the P-Chain height specified in an L1 block header. VMs can be computers that run on blockchain and allow smart contracts from multiple sources to interact with one another. The participants 110 send messages or issue transactions upon request by the participants 130, such as via a module of the participants 130 at a particular time. The messages may be validated by a validator of the blockchain network.

The network 150 may include a wired network (e.g., via fiber optic or copper wire, telephone lines, and the like) or wireless network (e.g., a cellular network, radio-frequency (RF) network, Wi-Fi, Bluetooth, and the like). The participants 110 may be any one of a mobile device, a laptop, a desktop, a tablet (e.g., palm or pad) device, a television, a display device, and/or the like. The participants 110 can be controlled by users as a set of validator nodes for making decisions in tandem, such as for facilitating operation or design of the blockchain implementations of the blockchain platform. Multiple participants 110 may have access to the blockchain platform hosted by the participants 130 via an online or offline connection, such as a wireless connection, wired connection, ad hoc connection, mobile connection, satellite connection, and/or the like. Each of the participants 130 may be a computing device such as part of a cloud computing server including one or more desktop computers or panels mounted on racks, and/or the like. The panels may include processing boards and also switchboards, routers, and other network devices.

Furthermore, features of the network architecture 100, combined with the epoched P-Chain mechanism implemented in the ProposerVM, substantially improve cross-subnet communication. By fixing the validator-set reference point for the duration of an epoch, the system avoids the need for repeated and expensive validator-set retrievals from the P-Chain during message verification. This reduces verification costs for all nodes and increases message-delivery reliability for relayers, who no longer risk constructing aggregate signatures that become invalid due to last-minute validator-set changes. The resulting architecture provides a more secure, deterministic, and scalable foundation for authenticated message passing across subnets and L1 blockchains.

The participants 130 may store data of the existing blockchain in a peer-to-peer (P2P) and/or distributed ledger fashion in a database 152. The database 152 may store relevant information regarding, for example, the shared registry, execution, and verification logic and/or rules for implementing messaging protocols, etc. In particular, the participants 130 may function in conjunction to autonomously manage the decentralized database(s) of the existing blockchain via the P2P network and a distributed timestamping server of the participants 130. The participants 130 may be configured to implement multiple chains of the blockchain network architecture 100. For example, the participants 130 can implement a plurality of chains of the blockchain network architecture 100, such as an asset blockchain (e.g., for creating new assets, asset exchange, cross-subnet transfers), metadata blockchain (e.g., for coordinating validators, tracking active subnets, and creating new subnets), smart contract blockchain (e.g., for creating smart contracts and applications that require total ordering), etc.

Figure 2:
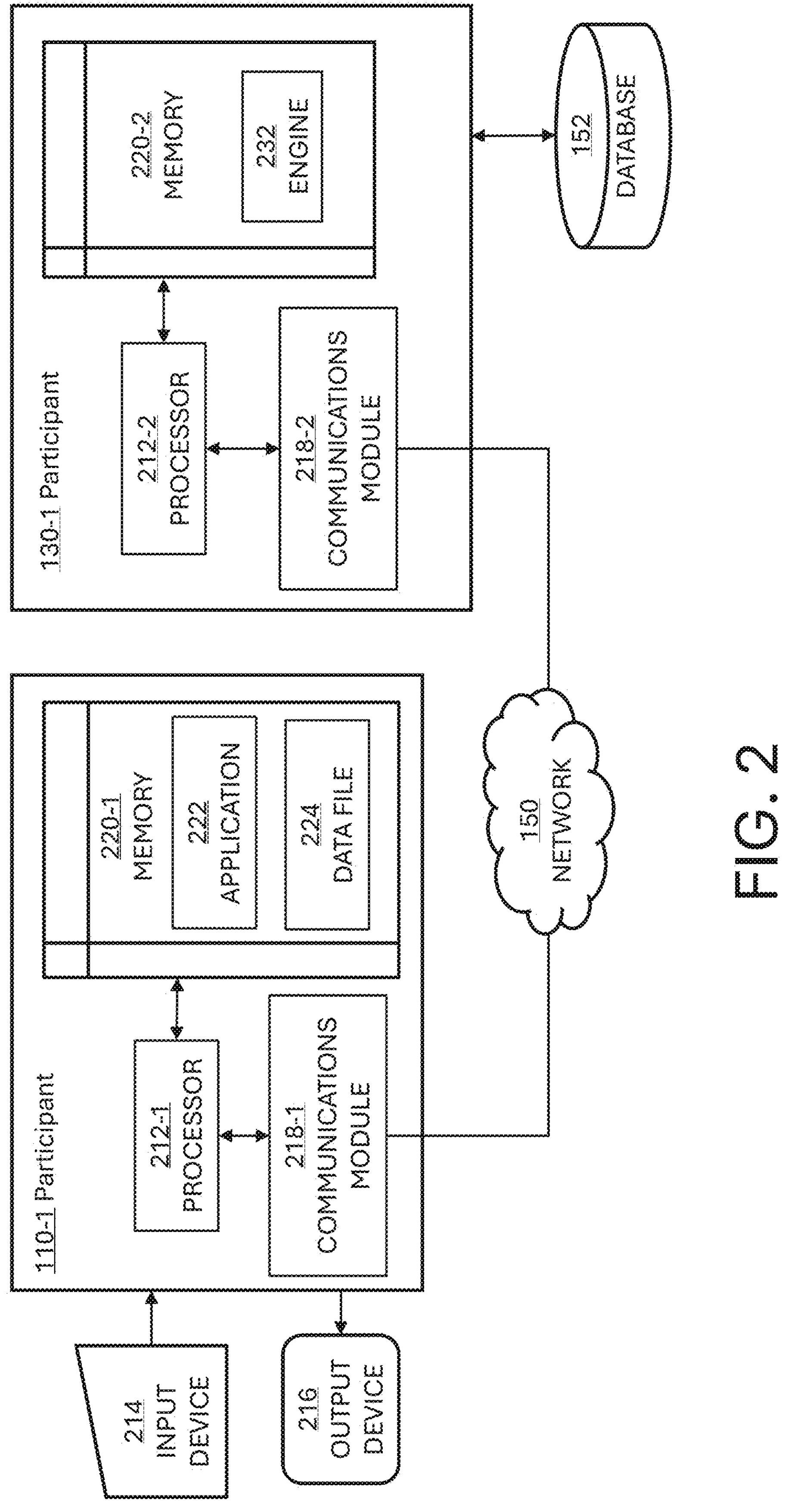
FIG. 2 is a block diagram illustrating details of participants used in the architecture of FIG. 1, according to some embodiments.

FIG. 2 is a block diagram of an example computing network 200 of an example blockchain platform for authenticated cross-subnet communication using a messaging protocol. The example computing network 200 may implement the messaging protocol for any subnet or chain in a platform, enabling both cross-chain and cross-subnet communication alike. FIG. 2 illustrates a participant (of one or more participants 110-1) and a server (of one or more participants 130-1) of the example computing network 200 for use in the network architecture of FIG. 1, according to some embodiments. The blockchain platform of the example computing network 200 may include blockchains represented by the one or more participants 110-1 and a plurality of platform blockchains validated and secured by a primary network and may be represented by the one or more participants 130-1.

A blockchain represented by participants 110-1 or 130-1 may execute the messaging protocol described herein. For instance, a message may be transmitted from participant 110-1 to participant 130-1, and participant 130-1 may reference the validator-registry chain to obtain the public keys and validator weights needed to verify the message's aggregate signature. Participants 110-1 and 130-1 may communicate through communications modules 218-1-218-2, which can include radio hardware, wired network interfaces, and associated software. Each computing device depicted in FIGS. 1-2 may include processors 212-1-212-2 and memories 220-1-220-2 (collectively, "processors 212" and "memories 220"), which execute blockchain-related software stacks, consensus engines, and messaging protocols. In some embodiments, the participants 110-1 and 130-1 may function as validator nodes capable of verifying blocks, participating in consensus, or proposing new blocks. Validators may receive rewards (e.g., cryptocurrency) in exchange for performing validation and staking operations required by the platform.

Generally, participant 110-1 and participant 130-1 each include computing devices containing memories 220 storing instructions and processors 212 configured to perform the methods described herein. For example, memory 220-1 of participant 110-1 may store instructions enabling the device to act as a validator, virtual machine, or relayer that assists in maintaining blockchain integrity and performing authenticated message transfer. Participant 110-1 may be one validator among many, participating in a selection process that determines which validator proposes the next block. Validator lists or sets may be derived by referring to the validator-registry chain, which stores the authoritative validator membership and weight information used for message verification and consensus operations.

Participant 110-1 may include user-configurable settings via input device 214, enabling an operator or user to configure message-processing logic, validator behavior, or other blockchain functions. Application information 222 may be stored in memory 220-1, including rules governing message transfer, transaction processing, block proposal, and validation workflows. Associated data may be stored in data file 224 or another database such as database 152. Participant 110-1 may provide a GUI or interface that allows the user to initiate transactions, submit messages, validate blocks, or perform other operations. Input devices 214 may include keyboards, touchscreens, mice, microphones, or any similar interface, while output devices 216 may include displays, speakers, or alerts. Memory 220-2 of participant 130-1 may store a messaging protocol and validation logic. The messaging protocol can include instructions for constructing, packaging, and broadcasting authenticated messages to other blockchains. Validation logic may include instructions for verifying message signatures against validator sets derived from the validator-registry chain, including verification steps that incorporate the epoched P-Chain height mechanism described herein.

Although certain functions above are described as being executed by processor 212-1 of participant 110-1 and others by processor 212-2 of participant 130-1, the system is not limited to this allocation. Any of the described functions may be performed by either device, by both devices, or by additional devices in the network. Participants 110-1 and 130-1 may be co-located or remote, and each may store both message-protocol logic and application-level data. In some embodiments, the components of participants 110-1 and 130-1 may be integrated into a larger shared computing environment.

The techniques described herein may be implemented as method(s) that are performed by physical computing device(s); as one or more non-transitory computer-readable storage media storing instructions which, when executed by computing device(s), cause performance of the method(s); or, as physical computing device(s) that are specially configured with a combination of hardware and software that causes performance of the method(s).

Epoched P-Chain Height System

Figure 3:
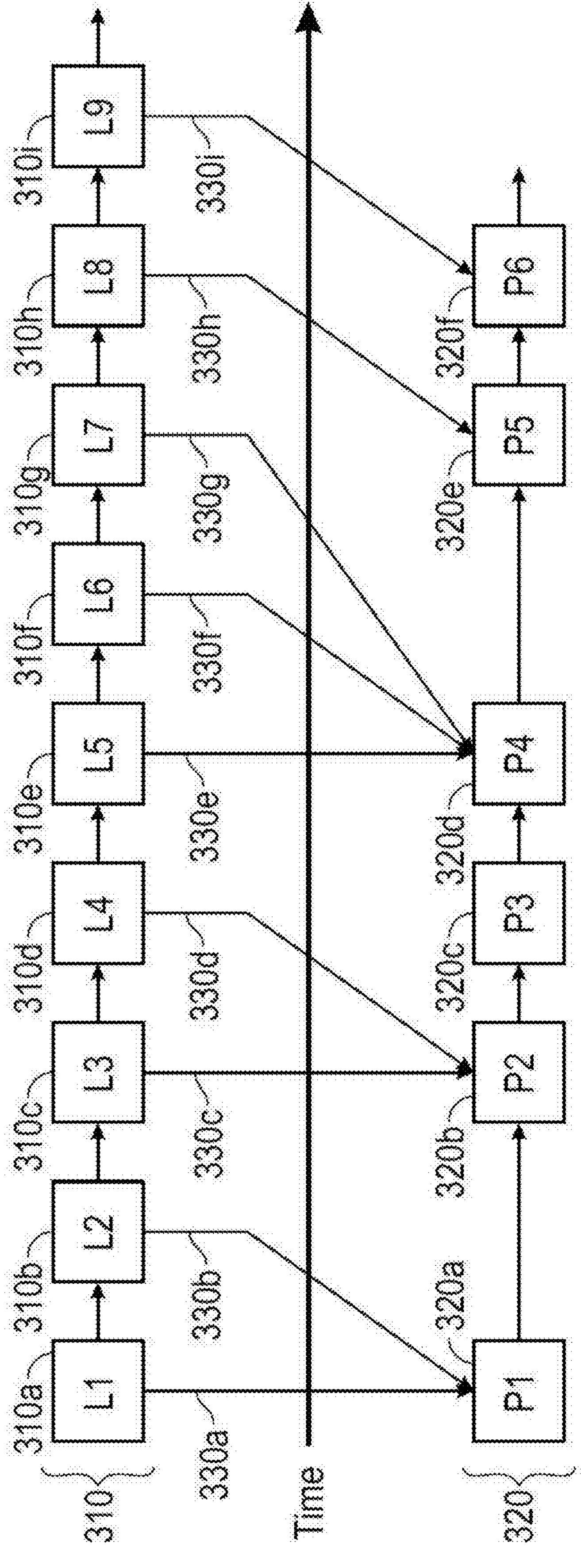
FIG. 3 illustrates an example of a current P-Chain view in which blocks of a verifying or layer-one (L1) blockchain independently reference arbitrary P-Chain block heights, according to certain aspects of the present disclosure.

FIG. 3 illustrates an example of a current P-Chain view in which blocks of a verifying or layer-one (L1) blockchain independently reference arbitrary P-Chain block heights, according to some embodiments.

A blockchain includes a sequence of L1 blocks, including L1 block 310*a*, L2 block 310*b*, L3 block 310*c*, L4 block 310*d*, L5 block 310*e*, L6 block 310*f*, L7 block 310*g*, L8 block 310*h*, and L9 block 310*i* (collectively referred to as "L1 blocks 310"), each include a pointer 330*a*-330*i* to a selected P-Chain block height among a series of P-Chain blocks, including blocks P1 block 320*a*, P2 block 320*b*, P3 block 320*c*, P4 block 320*d*, P5 block 320*e*, P6 block 320*f*, (collectively referred to as "P-Chain blocks 320"). Each of the L1 blocks 310 are produced sequentially over a progressing time axis labeled "Time" (similarly illustrated in FIGS. 4-5). The P-Chain operates as a coordination chain that maintains a validator registry used by multiple blockchains to validate inter-chain messages or perform state verification. The term "P-Chain," as used herein, refers to a control or platform chain within a multi-chain system configured to record validator metadata including validator identities, public keys, and stake weights, such that other chains in the network may retrieve validator sets from it for cryptographic message verification. Examples of such chains may include, without limitation, coordination blockchains, registry chains, or consensus metadata ledgers that manage validator assignments for subnet or application chains.

In FIG. 3, each successive L1 block points to an independent P-Chain height that may advance unpredictably/arbitrarily between L1 blocks 310. However, the P-Chain height referenced by an L1 block must advance and cannot decrease, meaning the P-Chain pointer may move forward but can never move backwards. For example, while L1 block 310*a* may reference the P1 block 320*a*, L2 block 310*b* could reference P2 block 320*b*, L3 block 310*c* could reference P2 block 320*b* or P3 block 320*c*, and L5 block 310*e* may skip intermediate heights and directly reference P4 block 320*d*. This arbitrary advancement results in non-deterministic validator set selection at the time each L1 block is produced, forcing nodes to perform expensive on-demand validator-set lookups at message-verification time. The term "validator set," as used herein, refers to a collection of active validators authorized by the P-Chain to sign or verify blocks and inter-chain messages for a given blockchain. Examples of validator set utilization may include, without limitation, verifying signatures on cross-chain messages, computing consensus weights, or validating proof-of-stake commitments.

Because each of the L1 blocks 310 in FIG. 3 determines its P-Chain height independently, validator lookups must be performed dynamically during block verification. This necessitates on-demand retrieval of the validator set corresponding to the P-Chain height indicated by each block's pointer 330 during L1 block execution. Such real-time lookups introduce computational and bandwidth overhead, as the required validator information may vary per block. Further, validator-set changes can lead to disagreement between nodes over message validity. According to embodiments, this limitation is resolved by modifying the arbitrary P-Chain pointer mechanism of FIG. 3 with an epoched P-Chain mechanism that maintains a consistent reference over a defined duration, thereby improving determinism and verification efficiency.

Figure 4:
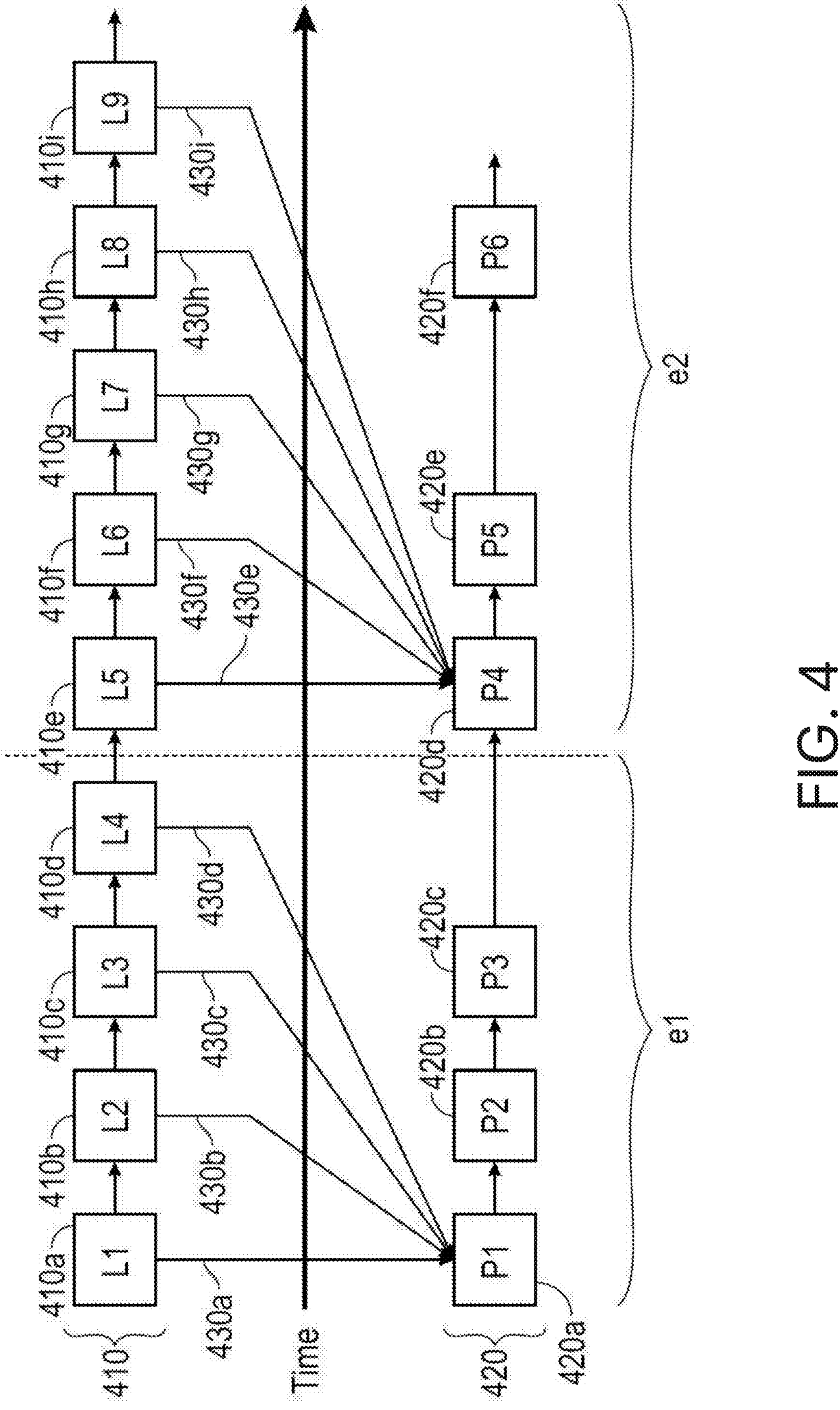
FIG. 4 illustrates a view of aspects of an epoched P-Chain mechanism, namely, an epoched P-Chain modification to how blockchains reference the validator registry stored on the P-Chain during cross-chain message verification, according to certain aspects of the present disclosure.

FIG. 4 illustrates a view of aspects of an epoched P-Chain mechanism 400, namely, an epoched P-Chain modification to how blockchains reference the validator registry stored on the P-Chain during cross-chain message verification, in accordance with certain embodiments of the present disclosure. The epoched P-Chain modification can be implemented by layers that inject P-Chain state into VMs, such as the ProposerVM.

Using the epoched P-Chain mechanism 400, the P-Chain block height used by an L1 blockchain is no longer allowed to advance arbitrarily on every block, but instead remains fixed for the duration of a defined epoch. All L1 blocks produced within the same epoch share a common PChainEpochHeight pointer, meaning that the validator set used to verify a cross-chain message (ICM) remains constant for the entire epoch duration D. Accordingly, any VM that implements it uses a P-Chain block height known prior to the generation of its next block. This would enable VMs to optimize validator set retrievals.

As illustrated in FIG. 4, a sequence of L1 blocks includes L1 block 410*a*, L2 block 410*b*, L3 block 410*c*, L4 block 410*d*, L5 block 410*e*, L6 block 410*f*, L7 block 410*g*, L8 block 410*h*, and L9 block 410*i* (collectively referred to as "L1 blocks 410"). L1 block 410*a*, L2 block 410*b*, L3 block 410*c*, and L4 block 410*d* each reference the same validator set corresponding to P-Chain block height at P1 block 420*a* within a set of P-Chain blocks 420 for the duration of epoch e1. Similarly, additional subsequent blocks L5 block 410*e*, L6 block 410*f*, L7 block 410*g*, L8 block 410*h*, and L9 block 410*i*, each reference the same P-Chain block height at P4 block 420*d* within the set of P-Chain blocks 420 for the duration of epoch e2, thereby depicting that all blocks produced during an epoch uniformly point to a single P-Chain height rather than advancing arbitrarily. According to embodiments, the P-Chain blocks are referenced by PChainEpochHeight pointers 430*a*-430*i* (collectively referred to as "PChainEpochHeight pointers 430") encoded in the block header of the proposing block (for example, L1 blocks 410) where each pointer identifies the specific P-Chain epoched block height whose validator set is to be used for validating messages or executing protocol operations associated with that proposing block.

According to embodiments, under the epoched P-Chain mechanism 400, the ProposerVM no longer updates the P-Chain height on a per-block basis. Instead, an epoch is defined as a continuous time interval (for example, five minutes) during which the P-Chain state used for message verification is held constant. Once an epoch begins, every L1 block produced before the epoch ends must reference the same P-Chain height. This eliminates the arbitrary block-by-block progression shown in FIG. 3 and ensures consistency across all nodes verifying ICM messages during the epoch. Nodes (for example, relayers) no longer need to perform repeated or unpredictable P-Chain lookups during block verification because the P-Chain block is known based on the timestamp.

Relayers benefit from the P-Chain height remaining constant within an epoch because it allows them to safely construct aggregate signatures using the validator set from that epoch's P-Chain height. Conventionally, relayers must sign messages using the validator set believed to be active at the verifying chain's P-Chain height, but changes to that height prior to block inclusion can invalidate otherwise valid signatures. By fixing the P-Chain height for an entire epoch, relayers gain a stable and predictable view of the validator set that will be used for verification. This ensures confidence that the receiving chain (also referred to as the verifying chain) will use the same validator set when verifying the message. This eliminates situations where relayers construct valid signatures that later become invalid because, for example, the P-Chain height advanced unexpectedly between message submission and block inclusion, reducing signature failure.

According to embodiments, duration of epochs can change based on when an epoch is sealed. An epoch can be defined as a contiguous range of blocks that share the same three values: epoch number, epoch P-Chain height, and epoch start time. Let $E_N$ denote an epoch with epoch number N. $E_N$'s start time is denoted as $$T^N_{start},$$

and its P-Chain height as $P_N$. An epoch $E_N$ must be sealed by a block before advancing to the next epoch. An epoch is sealed by the first block with a timestamp greater than or equal to $$T^N_{start} + D,$$

where D is a constant defined by the proposerVM or blockchain as the minimum required duration of an epoch. Let $B_{S_N}$ denote the block that sealed $E_N$. The sealing block is defined to be a member of the epoch it seals. This guarantees that every epoch will contain at least one block. The current epoch $E_N$ advances to the next epoch $E_{N+1}$ when the next block after $B_{S_N}$ is produced. This block will be a member of $E_{N+1}$, and will have the values: $P_{N+1}$ equal to the P-Chain height of $B_{S_N}$ and $$T^{N+1}_{start}$$

equal to $B_{S_N}$'s timestamp. The epoch number, N+1 increments the previous epoch's epoch number by 1.

Even though the P-Chain height is stable within an epoch, a node or relayer still cannot reliably predict what the next epoch's P-Chain height will be. That is, at the transition point between epochs, it is unknown how far the P-Chain blocks will have advanced. Accordingly, validator-set changes occurring immediately before a new epoch may unpredictably alter which validator set will be used in the subsequent epoch. Relayers cannot validate messages or transactions for the next epoch, because the P-Chain height for that next epoch is not known until the first block of that epoch is produced. To overcome these limitations, the epoched P-Chain mechanism 400 is extended to include a second pointer, distinct from the PChainEpochHeight pointers 430, that provides deterministic knowledge of the P-Chain height to be used in the next epoch, thereby ensuring predictable behavior across epoch transitions.

Figure 5:
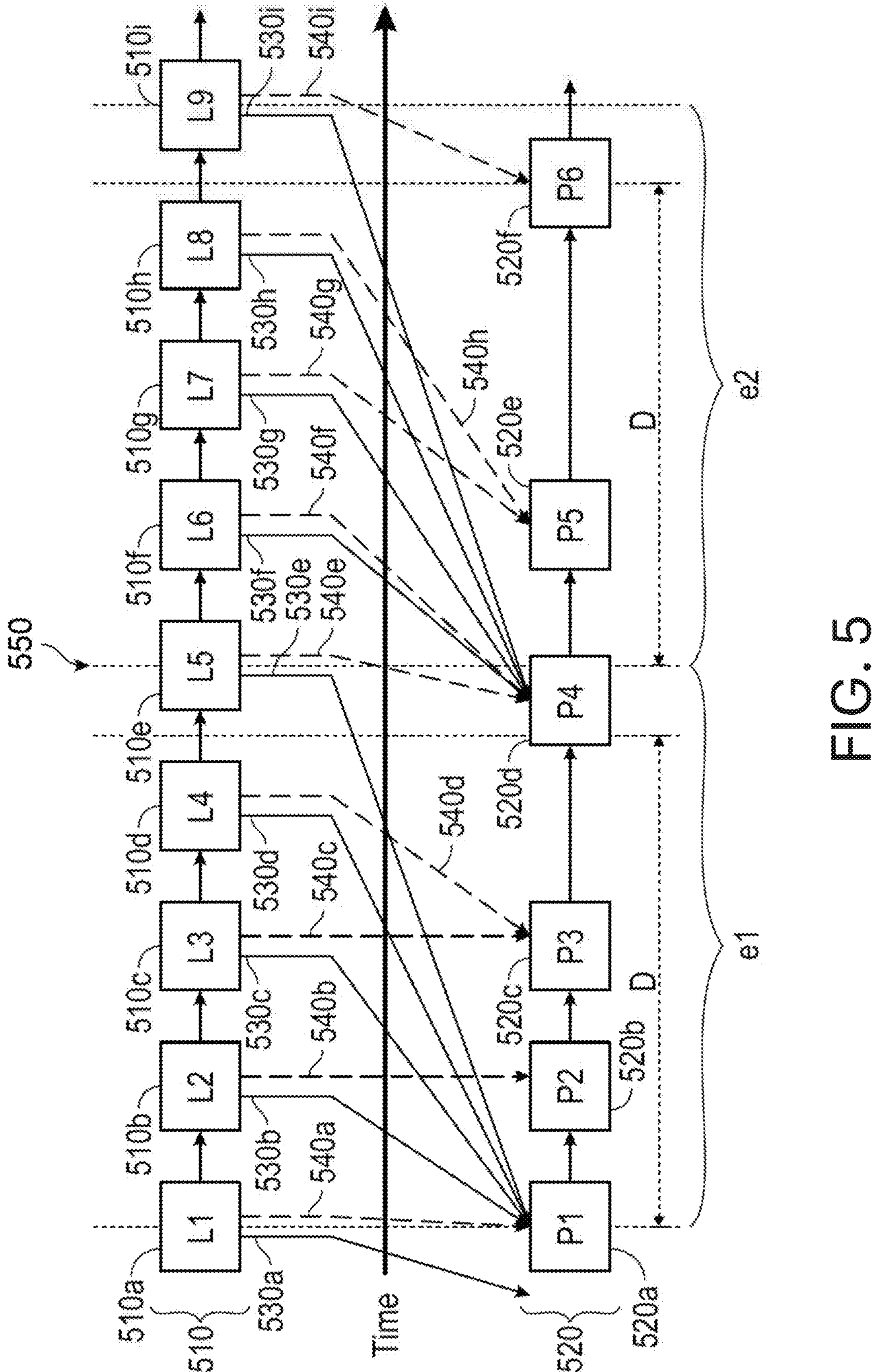
FIG. 5 illustrates an enhanced view of the epoched P-Chain mechanism with deterministic epoch transitions using a dual-pointer approach, according to certain aspects of the present disclosure.

FIG. 5 illustrates an enhanced view of the epoched P-Chain mechanism 500 with deterministic epoch transitions using a dual-pointer approach, in accordance with certain embodiments of the present disclosure. FIG. 5 demonstrates the temporal and structural relationship between L1 block production and the evolution of epoched P-Chain height references over at least two epochs.

As shown in FIG. 5, a sequence of L1 blocks including L1 block 510*a*, L2 block 510*b*, L3 block 510*c*, L4 block 510*d*, L5 block 510*e*, L6 block 510*f*, L7 block 510*g*, L8 block 510*h*, and L9 block 510*i* (collectively referred to as "L1 blocks 510"), are produced sequentially over time. Each of the L1 blocks 510 corresponds to a record generated by a blockchain implementing a proposer VM and contains one or more pointers that reference specific P-Chain block heights. The P-Chain includes a plurality of P-Chain blocks 520 including P1 block 520*a*, P2 block 520*b*, P3 block 520*c*, *P*4 block 520*d*, P5 block 520*e*, P6 block 520*f*, (collectively referred to as "P-Chain blocks 520"), each sequentially representing a block within the P-Chain that store validator registry data. According to the enhanced epoched P-Chain mechanism 500, each L1 block maintains two distinct pointers to the P-Chain: a PChainHeight pointer that reflects the proposer's most recent view of the P-Chain block tip, and a PChainEpochHeight 530 (including, as shown in FIG. 5, at least one of PChainEpochHeight 530*a*-530*i*) that defines the fixed P-Chain block height to be used for verifying all cross-chain messages during the current epoch.

Blocks L1, L2, L3, L4, and L5 are grouped into an epoch e1 with a duration of at least D. Each of the L1 blocks 510 within epoch e1 contains the same PChainEpochHeight pointing to P-Chain block P1. That is, each of PChainEpochHeight 530*b*-530*e* point to P1 block 520*a*. Blocks L6, L7, L8, and L9 are grouped into an epoch e2 with a duration of at least D. Each of the L1 blocks 510 within epoch e2 contains the same PChainEpochHeight pointing to P-Chain block P4. That is, each of PChainEpochHeight 530*f*-530*i* point to P4 block 520*d*.

Each of the L1 blocks 510 also encodes a PChainHeight 540 (including, as shown in FIG. 5, at least one of PChainEpochHeight 540*a*-540*i*) representing the proposer's current P-Chain height, which monotonically increases (for example, P1→P2→P3→P4) as the P-Chain progresses. Together, these two pointers allow the system to maintain a stable view of the validator set during the epoch while simultaneously tracking ongoing P-Chain advancement to enable deterministic epoch advancement.

The PChainHeight pointer is included and monotonically incremented in every block, rather than only in epoch-sealing blocks, to prevent a proposer of a sealing block from retaining or reverting an unduly stale P-Chain reference for the subsequent epoch. Because the PChainHeight encoded in each block must monotonically increase relative to its parent, the lowest P-Chain height observable by a sealing block proposer is constrained to be no less than the PChainHeight of the sealing block's parent. As a result, when the sealing block determines the PChainEpochHeight to be used in the next epoch, that value cannot be arbitrarily held back to an earlier height. If, instead, the PChainHeight were only included or updated in sealing blocks, a proposer could intentionally or erroneously reuse an outdated P-Chain height when transitioning to the next epoch, thereby extending the use of a stale validator set beyond its intended bounds. By advancing the PChainHeight continuously on a per-block basis, the system ensures that epoch transitions always reflect at least the most recent P-Chain height observed by prior blocks, bounding staleness and preserving the integrity of epoch-based validator selection.

According to embodiments, the epoched P-Chain mechanism transitions a current epoch to the next epoch once the first block is accepted whose timestamp is after the minimum epoch duration D past the current epoch's start time. Such a block is said to seal the current epoch, such that it will contain no further blocks. As shown in FIG. 5, L5 block 510*e* is the first block whose timestamp occurs after the minimum epoch duration D has elapsed from the epoch's start time. Accordingly, L5 block 510*e* operates as the sealing block for epoch e1 and is itself a member of epoch e1. At the time L5 block 510*e* is produced, its proposer observes the current P-Chain block height (for example, P4 block 520*d*). The term "sealing block," as used herein, refers to the first block whose timestamp exceeds the duration threshold for its current epoch, thereby determining the epoch transition point 550 and fixing the starting conditions for the subsequent epoch. Examples of sealing block behavior may include, without limitation, computing the snapshot of the P-Chain's validator registry, recording the epoch transition metadata in the block header, or updating epoch counters for network synchrony. Consequently, L6 block 510*f*, L7 block 510*g*, and L8 block 510*h* within the next epoch retain a constant epoched P-Chain height equal to that of the sealing block's P-Chain pointer until the next sealing event occurs (for example, triggered by L9 block 510*i*).

Since a sealing block is defined to be a member of the epoch it seals, there is no upper bound on an epoch's duration, since that sealing block may be produced at any point in the future beyond $$T^{N}_{start} + D.$$

+D. Because a sealing block is defined to be a member of the epoch it seals and also defines the start time of the next epoch, every epoch is guaranteed to have at least 1 block contained in it. It's possible for every block to be in its own epoch (that is, every block is a sealing block) if blocks are always at least D seconds apart from one another. If the start time of the next epoch was defined as the timestamp of the next block after a sealing block, then every epoch would be guaranteed to have at least 2 blocks in it (the starting block and the sealing block). This design requires more blocks to advance epochs, which is not an ideal design, and is not necessary to ensure that the PChainEpochHeight for next block is always known prior to that block being produced.

When a sealing block is generated, the next block updates its PChainEpochHeight pointer to the latest P-Chain block visible to the sealing block. By non-limiting example, the observed height at sealing block L5 is P-Chain block P4 which becomes the PChainEpochHeight for the next epoch e2, thereby assigning the PChainEpochHeight pointer to be the height at P4 block 520*d* for all blocks in epoch e2. This ensures that, even before the first block of the next epoch (for example, P6 block 520*f*) is produced, every validator and relayer already knows what P-Chain height will be used to verify messages in the next epoch. While the PChainEpochHeight 530 is the same for the duration of the next epoch, the PChainHeight 540 pointer will monotonically increase during the epoch as blocks are proposed, ensuring that by the time a sealing block is produced a latest P-Chain height will be referenced for the subsequent block and the subsequent epoch which starts with the subsequent block, preventing very stale views of the P-Chain.

According to embodiments, if a parent sealed its epoch, the current block is the first block in the new epoch, increments the epoch number, and must have a PChainEpochHeight equal to the PChainHeight of its parent. The new epoch has a start time of the timestamp of its parent block. Otherwise, the current block uses the current epoch height, number, and starting time, regardless of whether it seals the epoch. Because epochs may have unbounded duration (meaning you never know when the sealing block will be produced and seal the parent epoch), it is possible for a block's PChainEpochHeight to be arbitrarily far behind the tip of the P-Chain. In some embodiments, ensuring consistent block production and limiting the length of an epoch can avoid delay in time between when the P-Chain is updated and when those updates are taken into account for ICM verification of a next L1 block, ensuring epochs advance soon after duration D time has passed.

According to embodiments, after a sealing block is generated and, for example, prior to a next block being produced, nodes can pre-fetch the validator set at the P-Chain height of the sealing block referenced by the PChainHeight pointer since the nodes no longer need to guess the P-Chain height that will be used for the next epoch's blocks. As such, enabling asynchronous prefetching for validation routines.

The introduction of dual pointers ensures both deterministic verification and security. The PChainEpochHeight pointer provides stability by freezing the validator set for message verification within each epoch, while the upwardly monotonic PChainHeight pointer continues to advance with each block to reflect ongoing validator updates on the P-Chain. The epoched p-chain mechanism allows network nodes to perform validator set lookups a single time per epoch rather than at every block, and to perform validator set look ups preemptively for the next block prior to its production, improving memory caching efficiency, and reducing computational overhead (for example, by eliminating repeated lookups). Examples of system optimizations that benefit from this dual-pointer scheme may include, without limitation, preloading validator sets into memory, batching message signature verifications, or synchronizing relayer operations with deterministic epoch boundaries.

Figure 6:
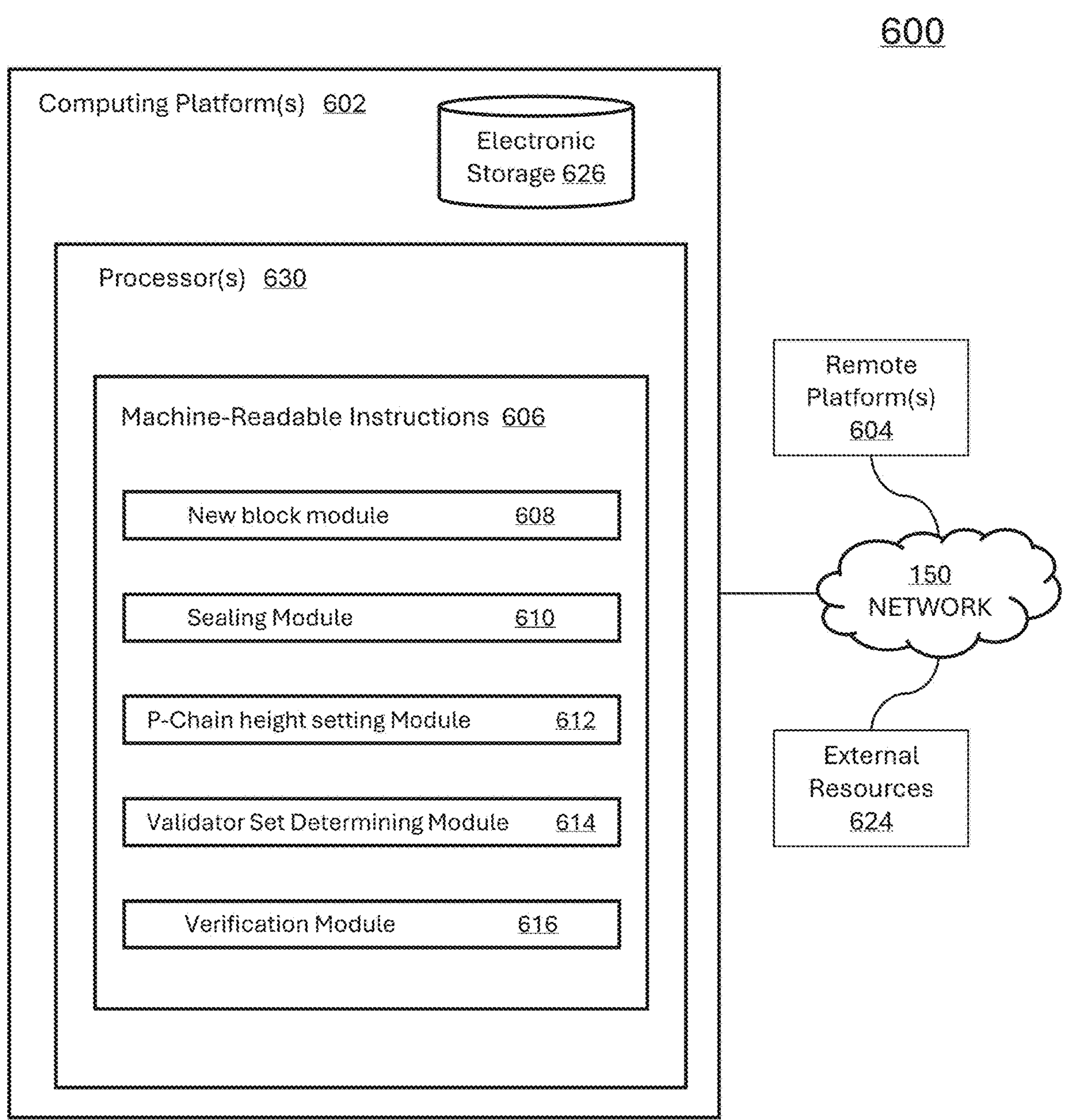
FIG. 6 is a block diagram illustrating a system configured for block verification, according to certain aspects of the present disclosure.

FIG. 6 is a block diagram illustrating an example computer system 600 with which aspects of the subject technology can be implemented. The system 600 may be configured for cross-chain (or subnet) message verification, according to certain aspects of the disclosure. The system 600 can be or include a blockchain system/platform for managing blockchains, each of which may be a linear chain of blocks such that each block has a parent block.

In some implementations, the system 600 may include one or more computing platforms 602. The computing platform(s) 602 can correspond to a server component of the blockchain platform, which can be similar to or the same as the computing device(s) of participant 130 of FIG. 1 and may interoperate with client devices and processing components described in other figures. For example, the computing platform(s) 602 may be configured to execute blockchain precompiles to generate, validate, or deliver a message from a source blockchain to a destination blockchain. Similarly, the blockchain precompiles may be applied to messages, for example, between two blockchains.

Computing platform(s) 602 can be configured to implement messaging protocols enabling the transfer of messages from the client computing device(s). The computing platform(s) 602 may represent blockchain platforms. The computing platform(s) 602 may be configured to communicate with one or more remote platforms 604 according to a client/server architecture, a peer-to-peer architecture, and/or other architectures. The remote platform(s) 604 may be configured to communicate with system 600 or with peer platforms. As an example, the remote platform(s) 604 can include relayers that determine the validator set applicable to the message being relayed. The remote platform(s) 604 can be configured to cause output of the system 600 on client device(s) of the remote platform(s) 604 with enabled access (e.g., based on analysis by the computing platform(s) 602) according to stored data. Any external blockchain platform built based on a platform/metadata chain of the computing platform(s) 602 that relies on the primary network may also realize the benefits of the messaging protocols. In this way, the platform chain, primary network, and other entities of the blockchain platform may communicate with the computing platform(s) 602. The computing platform(s) 602, external resources 624, and remote platform(s) 604 may be in communication and/or mutually accessible via network 150.

The computing platform(s) 602 may be configured by machine-readable instructions 606. Machine-readable instructions 606 may be executed by the computing platform(s) to implement one or more instruction modules stored as executable components. The instruction modules being implemented may include one or more of new block module 608, sealing module 610, P-Chain height setting module 612, validator set determining module 614, verification module 616 and/or other instruction modules.

New block module 608 is configured to build or receive a proposed block (for example, an L1 block) by a validator node or receive the proposed block for validation in a verifying chain. New block module 608 can be configured to read values embedded in a block header of the proposed block to validate and execute the proposed block. The values can include, for example, an epoch number, epoch duration, epoch start time, PChainHeight, and PChainEpochHeight. New block module 608 can be configured to assign proposed blocks a PChainEpochHeight based on their parent block; assigning the PChainEpochHeight or the PChainHeight of the parent block as the PChainEpochHeight of the proposed block. The PChainHeight of each block is set by the block builder and must monotonically increase (within certain bounds). When building a block, the verifying blockchain uses the PChainEpochHeight to ensure that when a block is built, the validator set to be used for the next block is known. For example, suppose block $b_m$ seals epoch $E_N$. Then the next block, $b_{m+1}$ will begin a new epoch, $E_{N+1}$ with PChainEpochHeight $P_{N+1}$ equal to $b_m$'s PChainHeight, $p_m$. If instead $b_m$ does not seal $E_N$, then $b_{m+1}$ will continue to use $P_N$. Both candidates for $b_{m+1}$'s P-Chain height ($p_m$ and $P_N$) are known at $b_m$ build time.

According to embodiments, system 600 is configured to maintain, for each block of the verifying chain, an epoched P-Chain height (that is, PChainEpochHeight) indicating a static reference height on the p-chain for a defined epoch and a latest P-Chain height (that is, PChainHeight) indicating a most recent block height of the P-Chain known to a block proposer at a timestamp of the proposed block. An epoch is defined as a contiguous range of blocks sharing a fixed reference p-chain height with a minimum duration (epoch duration). The minimum duration is configurable through network parameters and is applied as the minimum time interval for considering a sealing block valid to close an epoch. The epoch start time is set as the timestamp of the sealing block of a previous epoch, requiring all epochs to have a duration of at least the epoch duration as measured from the epoch's starting time to the timestamp of the epoch's sealing block.

Sealing module 610 is configured to identify an epoch boundary based on a duration threshold defined by the start time and epoch duration of the current epoch. In some embodiments, identifying the boundary includes checking if the proposed block's timestamp is at least the epoch start time and the epoch duration of the current epoch. Sealing module 610 is further configured to seal the current epoch with a sealing block based on the timestamp meeting the duration threshold. According to embodiments, the proposed block becomes the sealing block when the duration threshold is met (that is, proposed block timestamp≥duration threshold=epoch start time+epoch duration). The sealing block belongs to the epoch it seals (that is, the current epoch) and a timestamp associated with the sealing block becomes the start time of the next epoch.

P-Chain height setting module 612 is configured to set the epoched P-Chain height of the next block (following the sealing block) equal to the latest P-Chain height recorded in the sealing block. According to embodiments, if the proposed block did not seal the current epoch (for example, the proposed block's timestamp is less than the duration threshold), P-Chain height setting module 612 is configured to assign the next block the same epoched P-Chain height of the parent block. If the proposed block sealed the current epoch, P-Chain height setting module 612 is configured to assign the epoched P-Chain height of the next block to the latest P-Chain height of the proposed block.

According to embodiments, the latest P-Chain height and the epoched P-Chain height can only remain the same or increase over time.

According to some embodiments, system 600 can dynamically adjust the epoch duration by a predefined increment or decrement specified by a proposer or consensus protocol. Any adjusted duration would take effect beginning with the next epoch following a sealing block that records the adjusted duration value.

Validator set determining module 614 is configured to determine the validator sets that will be used for validating the proposed block based on the assigned epoched P-Chain height. The epoched P-Chain height is used to look up the validator sets of all other blockchains that the given chain is verifying ICM messages from. The validator set only needs to be identified at the start of an epoch, for example, at the first proposed block for a given epoch and remains fixed for the duration of the epoch. The proposing blockchain can reference an epoched P-Chain height pointer pointing to the set height indicating the validator set responsible for verifying the proposed block. The validator set determining module 614 can read the validator registry stored on the P-Chain at the epoched P-Chain height. According to embodiments, because each proposed block within an epoch points to the same P-Chain block, the validator set retrieved for message verification remains stable throughout the entire epoch. This reduces the need for repeated P-Chain lookups. Instead, validator set identification module 614 can identify the validator set and fetch the validator set once at the beginning of an epoch. In some embodiments, system 600 is configured to cache the validator set locally, and use the cached view for all message-verification operations during the epoch.

Verification module 616 is configured to verify inter-chain messages from transactions contained in the proposed blocks for the epoch duration using the validator set for the messages given source chain (for example, determined by validator set determining module 614) associated with the epoched platform chain height. The validator set can be used to parse validator weights, public keys, and threshold parameters. The verification module 616 can be configured to verify that each signer in an aggregate signature belongs to the validator set at the epoched platform chain height, compute an accumulated validator weight represented by the included signatures, and check whether a total signer weight meets a preset threshold (for example, ≥67%). The verification module 616 can be configured to verify an aggregate BLS signature using public keys from the epoch-fixed validator set and determine the validity of the message based on signature validity and weight threshold satisfaction.

According to some embodiments, system 600 can, in addition to verifying ICM messages, verify other VM state transitions or protocol operations that depend on the P-Chain view by using the PChainEpochHeight pointer supplied by the ProposerVM, thereby ensuring that all state transitions reference a consistent and protocol-authorized P-Chain state.

According to embodiments, once the verification is complete, commit module 618 is configured to commit the block's state transitions and updates its local chain state accordingly, accepting the proposed block as valid. In some embodiments, commit module 618 is further configured to advance epoch metadata to prepare for the processing of subsequent blocks, and update metadata for the next block's epoch context (that is, epoch start time, epoch number, and corresponding PChainEpochHeight). In some implementations, the computing platform(s) 602, the remote platform(s) 604, and/or the external resources 624 may be operatively linked via one or more electronic communication links. For example, such electronic communication links may be established, at least in part, via the network 150 such as the Internet and/or other networks. It will be appreciated that this is not intended to be limiting, and that the scope of this disclosure includes implementations in which the computing platform(s) 602, the remote platform(s) 604, and/or the external resources 624 may be operatively linked via some other communication media.

A given remote platform 604 may include client computing devices, which may each include one or more processors configured to execute computer program modules. The computer program modules may be configured to enable an expert or user associated with the given remote platform 604 to interface with the system 600 and/or external resources 624, and/or provide other functionality attributed herein to remote platform(s) 604. By way of non-limiting example, a given remote platform 604 and/or a given computing platform 602 may include one or more of a server, a desktop computer, a laptop computer, a handheld computer, a tablet computing platform, a NetBook, a Smartphone, a gaming console, and/or other computing platforms. The external resources 624 may include sources of information outside of the system 600, external entities participating with the system 600, and/or other resources. For example, the external resources 624 may include externally designed blockchain elements and/or applications designed by third parties. In some implementations, some or all of the functionality attributed herein to the external resources 624 may be provided by resources included in system 600.

Computing platform(s) 602 may include the electronic storage 626, a processor such as the processors 212, and/or other components. The computing platform(s) 602 may include communication lines, or ports to enable the exchange of information with a network and/or other computing platforms. Illustration of the computing platform(s) 602 in FIG. 6 is not intended to be limiting. The computing platform(s) 602 may include a plurality of hardware, software, and/or firmware components operating together to provide the functionality attributed herein to the computing platform(s) 602. For example, the computing platform(s) 602 may be implemented by a cloud of computing platforms operating together as the computing platform(s) 602.

Electronic storage 626 may include non-transitory storage media that electronically stores information. The electronic storage media of the electronic storage 626 may include one or both of system storage that is provided integrally (i.e., substantially non-removable) with computing platform(s) 602 and/or removable storage that is removably connectable to computing platform(s) 602 via, for example, a port (e.g., a USB port, a firewire port, etc.) or a drive (e.g., a disk drive, etc.). Electronic storage 626 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. Electronic storage 626 may include one or more virtual storage resources (e.g., cloud storage, a virtual private network, and/or other virtual storage resources). Electronic storage 626 may store software algorithms, information determined by the processors 212, information received from computing platform(s) 602, information received from the remote platform(s) 604, and/ or other information that enables the computing platform(s) 602 to function as described herein.

Processor(s) 630 may be configured to provide information processing capabilities in computing platform(s) 602. As such, processor(s) 630 may include one or more of a digital processor, an analog processor, a digital circuit designed to process information, an analog circuit designed to process information, a state machine, and/or other mechanisms for electronically processing information. Although processor(s) 630 is shown in FIG. 6 as a single entity, this is for illustrative purposes only. In some implementations, processor(s) 630 may include a plurality of processing units. These processing units may be physically located within the same device, or processor(s) 630 may represent processing functionality of a plurality of devices operating in coordination. Processor(s) 630 may be configured to execute modules 608, 610, 612, 614, 616, and/or 618, and/or other modules. Processor(s) 630 may be configured to execute modules 608, 610, 612, 614, 616, and/or 618, and/or other modules by software; hardware; firmware; some combination of software, hardware, and/or firmware; and/or other mechanisms for configuring processing capabilities on processor(s) 630. As used herein, the term "module" may refer to any component or set of components that perform the functionality attributed to the module. This may include one or more physical processors during execution of processor readable instructions, the processor readable instructions, circuitry, hardware, storage media, or any other components.

It should be appreciated that although modules 608, 610, 612, 614, 616, and/or 618 are illustrated in FIG. 6 as being implemented within a single processing unit, in implementations in which processor(s) 630 includes multiple processing units, one or more of modules 608, 610, 612, 614, 616, and/or 618 may be implemented remotely from the other modules. The description of the functionality provided by the different modules 608, 610, 612, 614, 616, and/or 618 described below is for illustrative purposes, and is not intended to be limiting, as any of modules 608, 610, 612, 614, 616, and/or 618 may provide more or less functionality than is described. For example, one or more of modules 608, 610, 612, 614, 616, and/or 618 may be eliminated, and some or all of its functionality may be provided by other ones of modules 608, 610, 612, 614, 616, and/or 618. As another example, processor(s) 630 may be configured to execute one or more additional modules that may perform some or all of the functionality attributed below to one of modules 608, 610, 612, 614, 616, and/or 618.

The techniques described herein may be implemented as method(s) that are performed by physical computing device(s); as one or more non-transitory computer-readable storage media storing instructions which, when executed by computing device(s), cause performance of the method(s); or, as physical computing device(s) that are specially configured with a combination of hardware and software that causes performance of the method(s).

Figure 7:
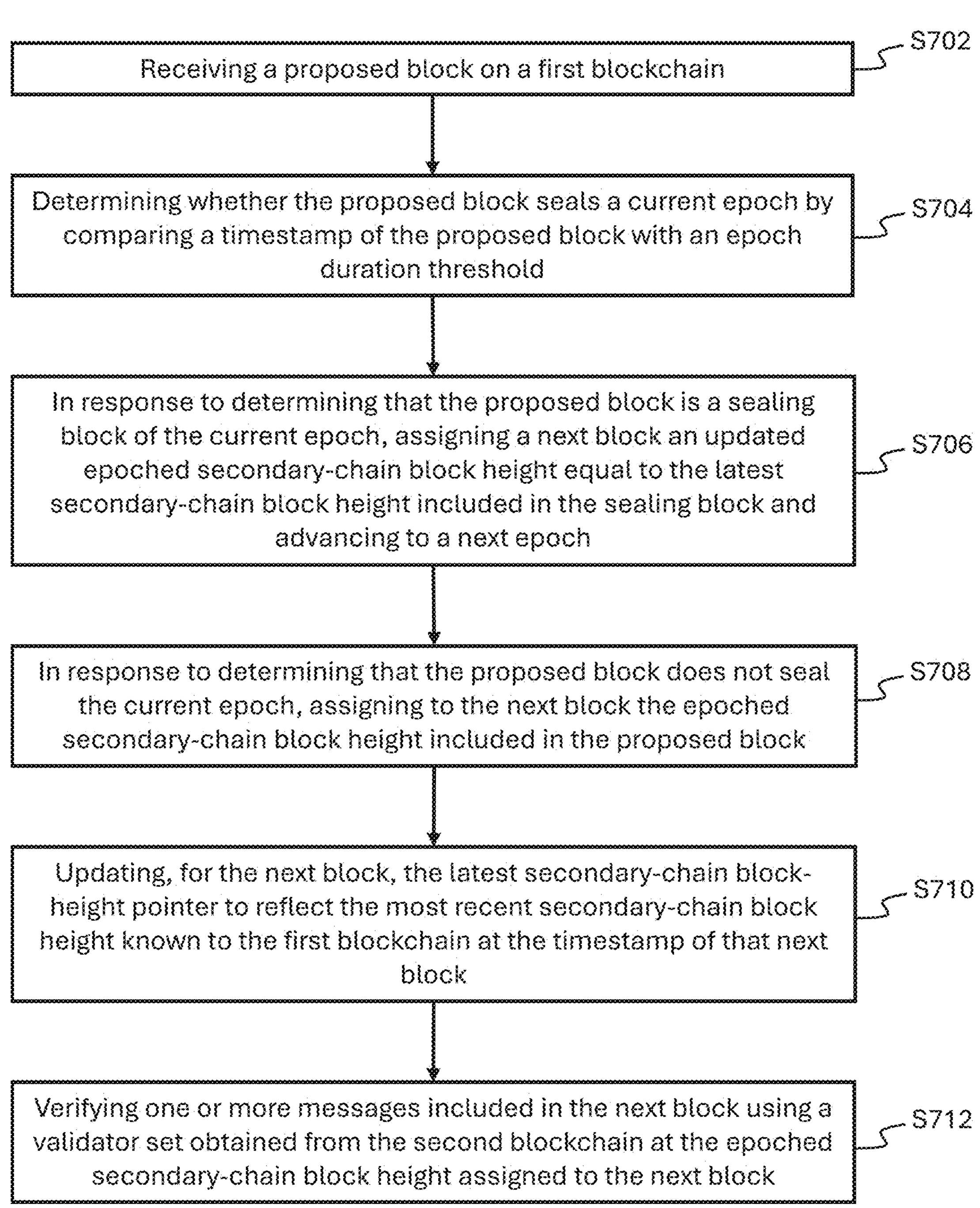
FIG. 7 illustrates an example flow diagram for verifying messages in a blockchain system, according to certain aspects of the present disclosure.

FIG. 7 illustrates an example flow diagram (e.g., process 700) for verifying messages in a blockchain system, according to certain aspects of the disclosure. For explanatory purposes, the steps of the example process 700 are described herein as occurring in serial, or linearly. However, multiple instances of the example process 700 may occur in parallel, overlapping in time, almost simultaneously, or in a different order from the order illustrated in the process 700. In addition, the blocks of the example process 700 need not be performed in the order shown and/or one or more of the blocks of the example process 700 need not be performed.

At step 702, process 700 includes receiving a proposed block on a first blockchain. The proposed block includes various parameters encoded in the block header including a latest secondary-chain block height and an epoched secondary-chain block height associated with a second blockchain. The block header can also include an epoch number, a minimum epoch duration, and an epoch start time. In some embodiments, process 700 includes identifying these parameters for every newly proposed block.

At step 704, process 700 includes determining whether the proposed block seals a current epoch by comparing a timestamp of the proposed block with an epoch duration threshold. According to embodiments, the epoch duration threshold is computed as an epoch start time plus a minimum epoch duration parameter defined by a virtual machine associated with the first blockchain. In other words, the last block in an epoch is the first block with a timestamp at or past the timestamp of the block that seals the previous epoch plus the minimum epoch duration parameter and that last block seals the epoch.

At step 706, process 700 includes, in response to determining that the proposed block is a sealing block of the current epoch, assigning a next block an updated epoched secondary-chain block height equal to the latest secondary-chain block height included in the sealing block and advancing to a next epoch. Advancing to the next epoch can include incrementing the epoch number assigned in the next block. This ensures that all blocks within an epoch are verified against a same validator set. According to embodiment, the sealing block is included in the current epoch and the next block is included in the next epoch.

At step 708, process 700 includes, in response to determining that the proposed block does not seal the current epoch, assigning to the next block the epoched secondary-chain block height included in the proposed block.

At step 710, process 700 includes updating, for the next block, the latest secondary-chain block-height pointer to reflect the most recent secondary-chain block height known to the first blockchain at the timestamp of that next block.

At step 712, process 700 includes verifying one or more messages included in the next block using a validator set obtained from the second blockchain at the epoched secondary-chain block height assigned to the next block. Accordingly, the next block will either be validated using the same validator set as the proposed block or validator set referenced in the latest secondary-chain height of the proposed block. This ensures that the system knows what validator set will validate a message before the block is even proposed using this epoched secondary-chain mechanism of block verification.

According to some embodiments, process 700 can further include performing a single lookup of a next validator set from the second blockchain at the updated epoched secondary-chain block height assigned to the next epoch, storing the next validator set for a duration of the next epoch, and verifying blocks proposed for the duration of the next epoch using the stored next validator set.

The techniques described herein (for example, process 700) may be implemented as method(s) that are performed by physical computing device(s); as one or more non-transitory computer-readable storage media storing instructions which, when executed by computing device(s), cause performance of the method(s); or as physical computing device(s) that are specially configured with a combination of hardware and software that causes performance of the method(s).

In some implementations, one or more operation blocks of FIG. 7 may be performed by a processor circuit executing instructions stored in a memory circuit, in a client device, a remote server or a database, communicatively coupled through a network (e.g., processors 212, memories 220, participant 110-1, participant 130-1, database(s) 152, and network 150).

Epoched P-Chain Height Workflow

Figure 8:
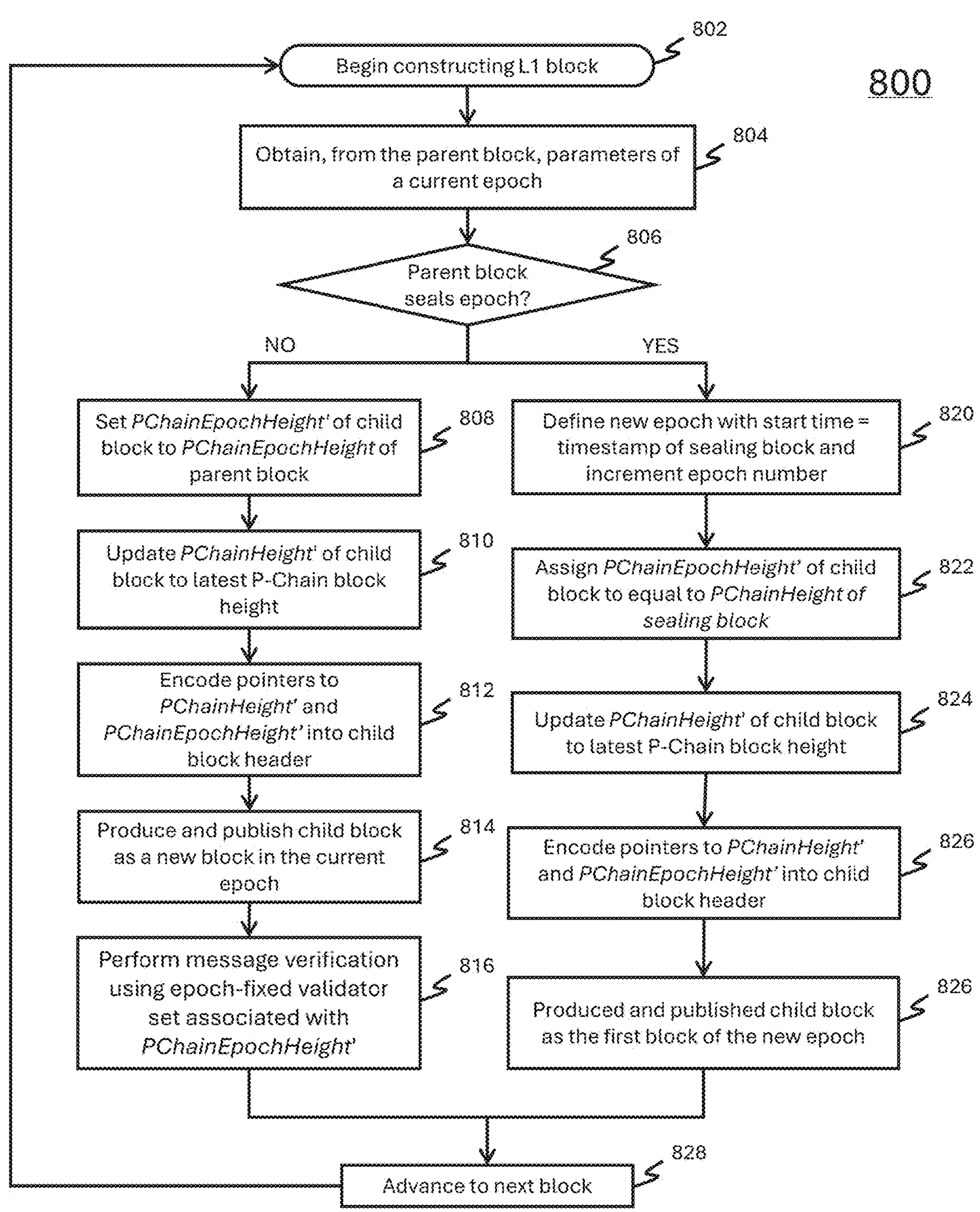
FIG. 8 illustrates an example flowchart of a method according to certain aspects of the present disclosure.

FIG. 8 illustrates an example flowchart of a method 800 for managing P-Chain reference heights during block production in a blockchain network by using a dual-pointer epoched P-Chain mechanism, according to embodiments described herein. The method depicted in FIG. 8 may be implemented by a proposer VM operating on validator nodes of a blockchain platform.

As shown in FIG. 8, processing begins at block 802, where a proposer or validator node begins constructing a new L1 block. At block 804, the proposer obtains, from reading the header of the parent block, parameters of a current epoch including (1) a PChainEpochHeight pointer representing the epoch-fixed P-Chain height used for all blocks during message verification within the current epoch and (2) a PChainHeight that indicates the most recent P-Chain block height known at the time the parent block was produced, (3) epoch number, (4) epoch duration, (5) and epoch start time.

At decision block 806, the proposer determines whether the parent block sealed the current epoch. This determination is made by comparing the timestamp of the parent block to the epoch start time plus the epoch duration. If the parent block did not seal the epoch, processing proceeds to block 808, where the proposer sets the PChainEpochHeight' of the child block (that is, new L1 block) equal to the PChainEpochHeight of the parent block, thereby preserving the epoch's fixed P-Chain view.

At block 810, the proposer updates PChainHeight' of the child block to reflect the most recent P-Chain block height available at the time of block construction (that is, block 802). At block 812, both pointers are encoded into the block header of the child block, and at block 814, the child block is produced and published to the network knowing its P-Chain epoch height is identical to all other blocks in the current epoch. At block 816, any inter-chain or authenticated cross-chain message verification performed during block execution uses the epoch-fixed validator set associated with the PChainEpochHeight' pointer.

If, at block 806, the proposer determines that the parent block did seal the epoch, and as such, is the sealing block, processing instead transitions to block 820, where a new epoch is defined by setting a new epoch start time equal to the timestamp of the sealing block and incrementing the epoch number.

At block 822, the proposer assigns the child block a PChainEpochHeight' equal to the PChainHeight recorded in the sealing block, thereby establishing a new epoch-fixed P-Chain height for all blocks produced in the new epoch. At block 824, the proposer updates PChainHeight' to reflect the most recent P-Chain height at block construction time (that is, block 802). At block 826, the updated PChainHeight' and PChainEpochHeight' pointers are encoded into the block header of the child block, and at block 830, the child block is produced and published to the network as the first block of the new epoch. In some embodiments, validator nodes may prefetch or cache the validator set corresponding to the epoch's PChainEpochHeight' so that message verification operations during the epoch can be performed efficiently using a consistent validator set. The node verifies any inter-chain messages included in the block by referencing the validator set associated with the PChainEpochHeight'.

Processing continues at block 828, where the system advances to the next block. The processing then loops back to block 802 for processing the next block. Because of the deterministic epoch pointer, the PChainEpochHeight applicable to the next block is known in advance before block L(n+1) is produced. That is, whether the new block will inherit a previous epoched P-Chain height or reference a new one. Thus, FIG. 8 illustrates a method in which dual P-Chain reference pointers—a latest P-Chain height pointer and an epoch-fixed PChainEpochHeight pointer—are used to provide predictable, monotonic, and verifiable updates to validator-set selection across epoch boundaries, improving consistency, reliability, and performance in inter-chain message verification.

Hardware Overview

Figure 9:
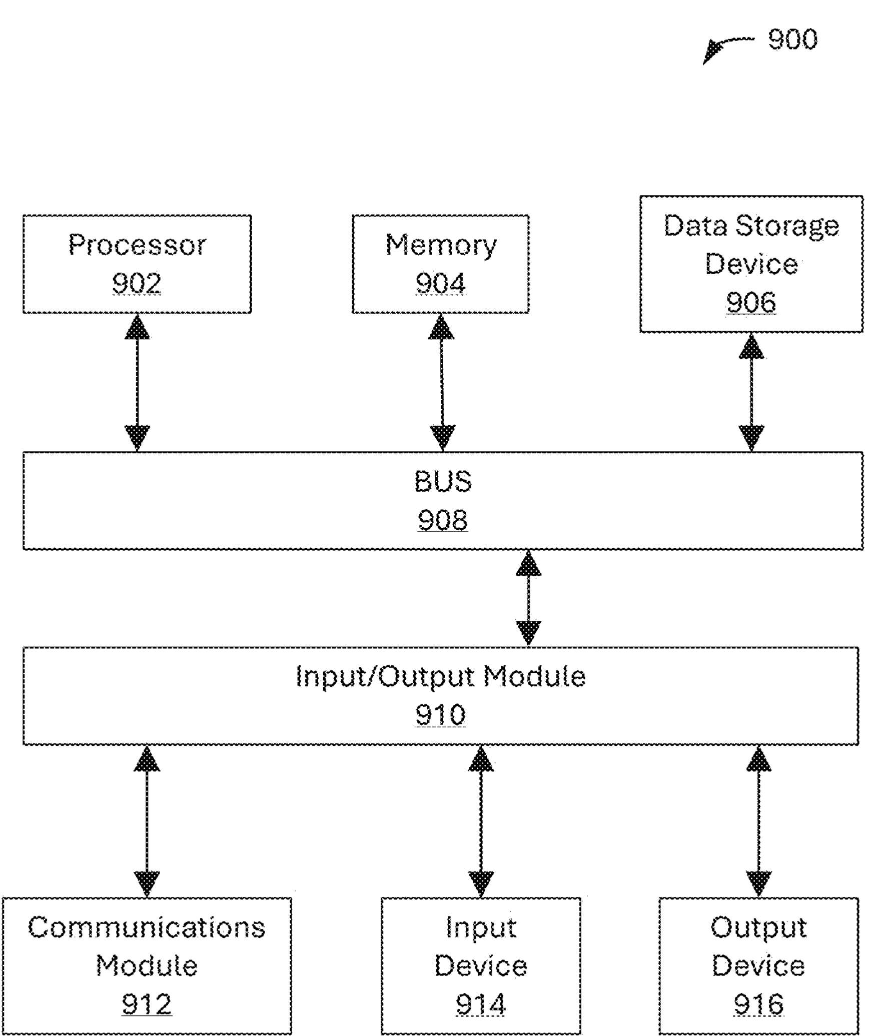
FIG. 9 is a block diagram illustrating an example computer system with which aspects of the subject technology can be implemented.

FIG. 9 is a block diagram illustrating an exemplary computer system 900 with which aspects of the subject technology can be implemented. In certain aspects, the computer system 900 may be implemented using hardware or a combination of software and hardware, either in a dedicated server, integrated into another entity, or distributed across multiple entities.

The computer system 900 (e.g., server and/or participant) includes a bus 908 or other communication mechanism for communicating information, and a processor 902 coupled with the bus 908 for processing information. By way of example, the computer system 900 may be implemented with one or more processors 902. Each of the one or more processors 902 may be a general-purpose microprocessor, a microcontroller, a Digital Signal Processor (DSP), an Application Specific Integrated Circuit (ASIC), a Field Programmable Gate Array (FPGA), a Programmable Logic Device (PLD), a controller, a state machine, gated logic, discrete hardware components, or any other suitable entity that can perform calculations or other manipulations of information.

The computer system 900 can include, in addition to hardware, code that creates an execution environment for the computer program in question, e.g., code that constitutes processor firmware, a protocol stack, a database management system, an operating system, or a combination of one or more of them stored in an included memory 904, such as a Random Access Memory (RAM), a flash memory, a Read-Only Memory (ROM), a Programmable Read-Only Memory (PROM), an Erasable PROM (EPROM), registers, a hard disk, a removable disk, a CD-ROM, a DVD, or any other suitable storage device, coupled to bus 908 for storing information and instructions to be executed by processor 902. Processor 902 and memory 904 can be supplemented by, or incorporated in, special purpose logic circuitry.

The instructions may be stored in memory 904 and implemented in one or more computer program products, i.e., one or more modules of computer program instructions encoded on a computer-readable medium for execution by, or to control the operation of, the computer system 900, and according to any method well-known to those of skill in the art, including, but not limited to, computer languages such as data-oriented languages (e.g., SQL, dBase), system languages (e.g., C, Objective-C, C++, Assembly), architectural languages (e.g., Java, .NET), and application languages (e.g., PHP, Ruby, Perl, Python). Instructions may also be implemented in computer languages such as array languages, aspect-oriented languages, assembly languages, authoring languages, command line interface languages, compiled languages, concurrent languages, curly-bracket languages, dataflow languages, data-structured languages, declarative languages, esoteric languages, extension languages, fourth-generation languages, functional languages, interactive mode languages, interpreted languages, iterative languages, list-based languages, little languages, logic-based languages, machine languages, macro languages, metaprogramming languages, multiparadigm languages, numerical analysis, non-English-based languages, object-oriented class-based languages, object-oriented prototype-based languages, off-side rule languages, procedural languages, reflective languages, rule-based languages, scripting languages, stack-based languages, synchronous languages, syntax handling languages, visual languages, Wirth languages, and xml-based languages. Memory 904 may also be used for storing temporary variable or other intermediate information during execution of instructions to be executed by processor 902.

A computer program as discussed herein does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, subprograms, or portions of code). A computer program can be deployed to be executed on one computer or on multiple computers that are located at one site or distributed across multiple sites and interconnected by a communication network. The processes and logic flows described in this specification can be performed by one or more programmable processors executing one or more computer programs to perform functions by operating on input data and generating output.

The computer system 900 further includes a data storage device 906 such as a magnetic disk or optical disk, coupled to bus 908 for storing information and instructions. The computer system 900 may be coupled via input/output module 910 to various devices. The input/output module 910 can be any input/output module. Exemplary input/output modules 910 include data ports such as USB ports. The input/output module 910 is configured to connect to a communications module 912. Exemplary communications modules 912 include networking interface cards, such as Ethernet cards and modems. In certain aspects, the input/output module 910 is configured to connect to a plurality of devices, such as an input device 914 and/or an output device 916. Exemplary input devices 914 include a keyboard and a pointing device, e.g., a mouse or a trackball, by which a user can provide input to the computer system 900. Other kinds of input devices can be used to provide for interaction with a user as well, such as a tactile input device, visual input device, audio input device, or brain-computer interface device. For example, feedback provided to the user can be any form of sensory feedback, e.g., visual feedback, auditory feedback, or tactile feedback, and input from the user can be received in any form, including acoustic, speech, tactile, or brain wave input. Exemplary output devices 916 include display devices such as an LCD (liquid crystal display) monitor, for displaying information to the user.

According to one aspect of the present disclosure, the above-described systems can be implemented using a computer system 900 in response to the processor 902 executing one or more sequences of one or more instructions contained in the memory 904. Such instructions may be read into memory 904 from another machine-readable medium, such as data storage device 906. Execution of the sequences of instructions contained in the main memory 904 causes the processor 902 to perform the process steps described herein. One or more processors in a multi-processing arrangement may also be employed to execute the sequences of instructions contained in the memory 904. In alternative aspects, hard-wired circuitry may be used in place of or in combination with software instructions to implement various aspects of the present disclosure. Thus, aspects of the present disclosure are not limited to any specific combination of hardware circuitry and software.

Various aspects of the subject matter described in this specification can be implemented in a computing system that includes a back end component, e.g., such as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. The communication network can include, for example, any one or more of a LAN, a WAN, the Internet, and the like. Further, the communication network can include, but is not limited to, for example, any one or more of the following network topologies, including a bus network, a star network, a ring network, a mesh network, a star-bus network, tree or hierarchical network, or the like. The communications modules can be, for example, modems or Ethernet cards.

The computer system 900 can include clients and servers. A client and server are generally remote from each other and typically interact through a communication network. The relationship of client and server arises by virtue of computer programs running on the respective computers and having a client-server relationship to each other. The computer system 900 can be, for example, and without limitation, a desktop computer, laptop computer, or tablet computer. The computer system 900 can also be embedded in another device, for example, and without limitation, a mobile telephone, a PDA, a mobile audio player, a Global Positioning System (GPS) receiver, a video game console, and/or a television set top box.

The term "machine-readable storage medium" or "computer-readable medium" as used herein refers to any medium or media that participates in providing instructions to the processor 902 for execution. Such a medium may take many forms, including, but not limited to, non-volatile media, volatile media, and transmission media. Non-volatile media include, for example, optical or magnetic disks, such as the data storage device 906. Volatile media include dynamic memory, such as the memory 904. Transmission media include coaxial cables, copper wire, and fiber optics, including the wires that comprise the bus 908. Common forms of machine-readable media include, for example, floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH EPROM, any other memory chip or cartridge, or any other medium from which a computer can read. The machine-readable storage medium can be a machine-readable storage device, a machine-readable storage substrate, a memory device, a composition of matter effecting a machine-readable propagated signal, or a combination of one or more of them.

The techniques described herein may be implemented as method(s) that are performed by physical computing device(s); as one or more non-transitory computer-readable storage media storing instructions which, when executed by computing device(s), cause performance of the method(s); or, as physical computing device(s) that are specially configured with a combination of hardware and software that causes performance of the method(s).

As used herein, the phrase "at least one of" preceding a series of items, with the terms "and" or "or" to separate any of the items, modifies the list as a whole, rather than each member of the list (i.e., each item). The phrase "at least one of" does not require selection of at least one item; rather, the phrase allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

To the extent that the terms "include," "have," or the like is used in the description or the claims, such term is intended to be inclusive in a manner similar to the term "comprise" as "comprise" is interpreted when employed as a transitional word in a claim. The word "exemplary" is used herein to mean "serving as an example, instance, or illustration." Any embodiment described herein as "exemplary" is not necessarily to be construed as preferred or advantageous over other embodiments.

A reference to an element in the singular is not intended to mean "one and only one" unless specifically stated, but rather "one or more." All structural and functional equivalents to the elements of the various configurations described throughout this disclosure that are known or later come to be known to those of ordinary skill in the art are expressly incorporated herein by reference and intended to be encompassed by the subject technology. Moreover, nothing disclosed herein is intended to be dedicated to the public regardless of whether such disclosure is explicitly recited in the above description.

While this specification contains many specifics, these should not be construed as limitations on the scope of what may be claimed, but rather as descriptions of particular implementations of the subject matter. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

The subject matter of this specification has been described in terms of particular aspects, but other aspects can be implemented and are within the scope of the following claims. For example, while operations are depicted in the drawings in a particular order, this should not be understood as requiring that such operations be performed in the particular order shown or in sequential order, or that all illustrated operations be performed to achieve desirable results. The actions recited in the claims can be performed in a different order and still achieve desirable results. As one example, the processes depicted in the accompanying figures do not necessarily require the particular order shown, or sequential order, to achieve desirable results. In certain circumstances, multitasking and parallel processing may be advantageous. Moreover, the separation of various system components in the aspects described above should not be understood as requiring such separation in all aspects, and it should be understood that the described program components and systems can generally be integrated together in a single software product or packaged into multiple software products. Other variations are within the scope of the following claims.

It should be understood that the original applicant herein determines which technologies to use and/or productize based on their usefulness and relevance in a constantly evolving field, and what is best for it and its players and users. Accordingly, it may be the case that the systems and methods described herein have not yet been and/or will not later be used and/or productized by the original applicant. It should also be understood that implementation and use, if any, by the original applicant, of the systems and methods described herein are performed in accordance with its privacy policies. These policies are intended to respect and prioritize player privacy, and to meet or exceed government and legal requirements of respective jurisdictions. To the extent that such an implementation or use of these systems and methods enables or requires processing of user personal information, such processing is performed (i) as outlined in the privacy policies; (ii) pursuant to a valid legal mechanism, including but not limited to providing adequate notice or where required, obtaining the consent of the respective user; and (iii) in accordance with the player or user's privacy settings or preferences. It should also be understood that the original applicant intends that the systems and methods described herein, if implemented or used by other entities, be in compliance with privacy policies and practices that are consistent with its objective to respect players and user privacy.

What is claimed is:

1. A computer-implemented method for verifying messages in a blockchain system, the method comprising:

receiving a proposed block on a first blockchain, the proposed block including (i) a latest secondary-chain block height and (ii) an epoched secondary-chain block height associated with a second blockchain;

determining whether the proposed block seals a current epoch by comparing a timestamp of the proposed block with an epoch duration threshold;

in response to determining that the proposed block is a sealing block of the current epoch:

(i) assigning a next block an updated epoched secondary-chain block height equal to the latest secondary-chain block height included in the sealing block, and (ii) advancing to a next epoch; and verifying one or more messages included in the next block using a validator set obtained from the second blockchain at the epoched secondary-chain block height assigned to the next block, wherein all blocks within an epoch are verified against a same validator set.

2. The computer-implemented method of claim 1, further comprising identifying the latest secondary-chain block height, the epoched secondary-chain block height, an epoch number, a minimum epoch duration, and an epoch start time from a block header of the proposed block.

3. The computer-implemented method of claim 1, wherein the epoch duration threshold is computed as an epoch start time plus a minimum epoch duration parameter defined by a virtual machine associated with the first blockchain.

4. The computer-implemented method of claim 1, further comprising monotonically increasing, for each newly proposed block, a latest secondary-chain block height pointer corresponding to a most recent secondary-chain block height observable by the first blockchain at a timestamp of the newly proposed block.

5. The computer-implemented method of claim 1, wherein the sealing block is included in the current epoch and the next block is included in the next epoch.

6. The computer-implemented method of claim 1, further comprising obtaining, at a block height corresponding to the epoched secondary-chain block height, a validator set recorded on the second blockchain.

7. The computer-implemented method of claim 1, wherein the latest secondary-chain block height is set by a block builder.

8. The computer-implemented method of claim 1, further comprising, in response to determining that the proposed block does not seal the current epoch, assigning to the next block the epoched secondary-chain block height included in the proposed block.

9. The computer-implemented method of claim 1, wherein advancing to the next epoch further comprises:

incrementing an epoch number; and assigning the incremented epoch number to the next block.

10. The computer-implemented method of claim 1, further comprising:

performing a single lookup of a next validator set from the second blockchain at the updated epoched secondary-chain block height assigned to the next epoch;

storing the next validator set for a duration of the next epoch; and verifying blocks proposed for the duration of the next epoch using the stored next validator set.

11. A system for verifying messages in a blockchain system, comprising:

one or more processors; and a memory comprising instructions stored thereon, which when executed by the one or more processors, causes the one or more processors to perform:

receiving a proposed block on a first blockchain, the proposed block including (i) a latest secondary-chain block height and (ii) an epoched secondary-chain block height associated with a second blockchain;

determining whether the proposed block seals a current epoch by comparing a timestamp of the proposed block with an epoch duration threshold;

in response to determining that the proposed block is a sealing block of the current epoch:

(i) assigning a next block an updated epoched secondary-chain block height equal to the latest secondary-chain block height included in the sealing block, and (ii) advancing to a next epoch;

in response to determining that the proposed block does not seal the current epoch, assigning to the next block the epoched secondary-chain block height included in the proposed block; and verifying one or more messages included in the next block using a validator set obtained from the second blockchain at the epoched secondary-chain block height assigned to the next block, wherein all blocks within an epoch are verified against a same validator set.

12. The system of claim 11, further comprising stored sequences of instructions, which when executed by the one or more processors, cause the one or more processors to perform identifying the latest secondary-chain block height, the epoched secondary-chain block height, an epoch number, a minimum epoch duration, and an epoch start time from a block header of the proposed block.

13. The system of claim 11, wherein the epoch duration threshold is computed as an epoch start time plus a minimum epoch duration parameter defined by a virtual machine associated with the first blockchain.

14. The system of claim 11, further comprising stored sequences of instructions, which when executed by the one or more processors, cause the one or more processors to perform monotonically increasing, for each newly proposed block, a latest secondary-chain block height pointer corresponding to a most recent secondary-chain block height observable by the first blockchain at a timestamp of the newly proposed block.

15. The system of claim 11, wherein the sealing block is included in the current epoch and the next block is included in the next epoch.

16. The system of claim 11, further comprising stored sequences of instructions, which when executed by the one or more processors, cause the one or more processors to perform obtaining, at a block height corresponding to the epoched secondary-chain block height, a validator set recorded on the second blockchain.

17. The system of claim 11, wherein the latest secondary-chain block height is set by a block builder.

18. The system of claim 11, wherein advancing to the next epoch further comprises stored sequences of instructions, which when executed by the one or more processors, cause the one or more processors to perform:

incrementing an epoch number; and assigning the incremented epoch number to the next block.

19. The system of claim 11, further comprising stored sequences of instructions, which when executed by the one or more processors, cause the one or more processors to perform:

prefetching, using a single lookup operation, of a next validator set from the second blockchain at the updated epoched secondary-chain block height assigned to the next epoch;

storing the next validator set for a duration of the next epoch; and verifying blocks proposed for the duration of the next epoch using the stored next validator set.

20. A non-transitory computer-readable storage medium comprising instructions stored thereon, which when executed by one or more processors, cause the one or more processors to perform operations for verifying messages in a blockchain system, comprising:

receiving a proposed block on a first blockchain, the proposed block including (i) a latest secondary-chain block height and (ii) an epoched secondary-chain block height associated with a second blockchain;

determining whether the proposed block seals a current epoch by comparing a timestamp of the proposed block with an epoch duration threshold;

in response to determining that the proposed block is a sealing block of the current epoch:

(i) assigning a next block an updated epoched secondary-chain block height equal to the latest secondary-chain block height included in the sealing block, and (ii) advancing to a next epoch;

in response to determining that the proposed block does not seal the current epoch, assigning to the next block the epoched secondary-chain block height included in the proposed block; and verifying one or more messages included in the next block using a validator set obtained from the second blockchain at the epoched secondary-chain block height assigned to the next block, wherein all blocks within an epoch are verified against a same validator set.

* * * * *